United States Patent
Kim et al.

(10) Patent No.: US 9,444,247 B2
(45) Date of Patent: Sep. 13, 2016

(54) APPARATUS AND METHOD OF PROTECTING POWER RECEIVER OF WIRELESS POWER TRANSMISSION SYSTEM

(75) Inventors: Dong Zo Kim, Yongin-si (KR); Sang Wook Kwon, Seongnam-si (KR); Ki Young Kim, Yongin-si (KR); Nam Yun Kim, Seoul (KR); Yun Kwon Park, Dongducheon-si (KR); Eun Seok Park, Yongin-si (KR); Young Ho Ryu, Yongin-si (KR); Chang Wook Yoon, Seoul (KR); Jin Sung Choi, Seoul (KR); Young Tack Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 814 days.

(21) Appl. No.: 13/473,859

(22) Filed: May 17, 2012

(65) Prior Publication Data

US 2012/0293009 A1 Nov. 22, 2012

(30) Foreign Application Priority Data

May 17, 2011 (KR) .................. 10-2011-0046278
May 24, 2011 (KR) .................. 10-2011-0049243
Apr. 2, 2012 (KR) .................. 10-2012-0033957

(51) Int. Cl.
*H02H 7/125* (2006.01)
*B60L 11/18* (2006.01)
(Continued)

(52) U.S. Cl.
CPC ........... *H02H 7/1252* (2013.01); *B60L 11/182* (2013.01); *H02J 7/025* (2013.01); *H02J 7/0004* (2013.01); *Y02T 10/7005* (2013.01); *Y02T 10/7072* (2013.01); *Y02T 90/122* (2013.01); *Y02T 90/14* (2013.01)

(58) Field of Classification Search
CPC ....... H01F 38/14; H02J 5/005; H02J 717/00; B60L 11/182
USPC .......................................................... 307/104
See application file for complete search history.

(56) References Cited

U.S. PATENT DOCUMENTS

| 6,351,402 B1* | 2/2002 | Carroll ......................... 363/125 |
| 2009/0312046 A1 | 12/2009 | Clevenger et al. |
| 2010/0117454 A1* | 5/2010 | Cook et al. ................... 307/104 |

(Continued)

FOREIGN PATENT DOCUMENTS

| JP | 06-315222 A | 11/1994 |
| JP | 2006-281404 A | 10/2006 |

(Continued)

*Primary Examiner* — Thienvu Tran
*Assistant Examiner* — David M Stables
(74) *Attorney, Agent, or Firm* — NSIP Law

(57) ABSTRACT

An apparatus and method of protecting a power receiver of a wireless power transmission system are provided. A wireless power receiver includes a rectifier comprising an input and an output, and configured to receive a signal through the input, to rectify the signal to produce a rectified signal, and to output the rectified signal through the output, and a capacitor connected to the output of the rectifier and to ground. The wireless power receiver further includes a direct current-to-direct current (DC/DC) converter connected to the output of the rectifier and to a load, and configured to convert the rectified signal to a power, and to provide the power to the load, and a device configured to create a short circuit to protect the rectifier and/or the capacitor when a voltage greater than a threshold voltage is applied to the input of the rectifier and/or the output of the rectifier.

9 Claims, 28 Drawing Sheets

(51) Int. Cl.
*H02J 7/02* (2016.01)
*H02J 7/00* (2006.01)

(56) References Cited

U.S. PATENT DOCUMENTS

| | | | | |
|---|---|---|---|---|
| 2010/0127660 A1* | 5/2010 | Cook et al. | | 320/108 |
| 2010/0181961 A1* | 7/2010 | Novak | | H02J 7/025 |
| | | | | 320/108 |
| 2010/0277003 A1* | 11/2010 | Von Novak | | H02J 7/025 |
| | | | | 320/108 |
| 2010/0323616 A1* | 12/2010 | Von Novak | | H02J 7/0054 |
| | | | | 455/41.1 |
| 2011/0053500 A1* | 3/2011 | Menegoli | | H04B 5/0037 |
| | | | | 455/41.1 |
| 2011/0062788 A1* | 3/2011 | Chen et al. | | 307/104 |

FOREIGN PATENT DOCUMENTS

| | | |
|---|---|---|
| JP | 2008-236815 A | 10/2008 |
| KR | 20-1998-9962297 | 11/1998 |
| KR | 10-2003-0070558 A | 8/2003 |
| KR | 10-2006-0094715 A | 8/2006 |
| KR | 10-2008-0095643 A | 10/2008 |
| KR | 10-2010-0125894 A | 12/2010 |

* cited by examiner

APPARATUS AND METHOD OF PROTECTING POWER RECEIVER OF WIRELESS POWER TRANSMISSION SYSTEM

CROSS-REFERENCE TO RELATED APPLICATION(S)

This application claims the benefit under 35 U.S.C. §119 (a) of Korean Patent Application No. 10-2011-0046278, filed on May 17, 2011, Korean Patent Application No. 10-2011-0049243, filed on May 24, 2011, and Korean Patent Application No. 10-2012-0033957, filed on Apr. 2, 2012, in the Korean Intellectual Property Office, the entire disclosures of which are incorporated herein by reference for all purposes.

BACKGROUND

1. Field

The following description relates to an apparatus and method for wireless power transmission, and more particularly, to an apparatus and method of protecting a power receiver in a wireless power transmission system.

2. Description of Related Art

A wireless power refers to energy transferred from a wireless power transmission apparatus to a wireless power reception apparatus, via magnetic coupling. A method of transmitting a wireless power has been provided for a number of products, ranging from an electric vehicle transmitting a power greater than or equal to a few kilowatts (kW), to a high power application consuming a power greater than or equal to 100 W and a low power application consuming a power less than or equal to 10 W. The low power application may be used for, e.g., a mobile device.

A wireless power reception apparatus may charge a battery using a received energy. A wireless power transmission and charging system includes a source device and a target device. The source device wirelessly transmits a power. On the other hand, the target device wirelessly receives a power. In other words, the source device may be referred to as a wireless power transmission apparatus, and the target device may be referred to as a wireless power reception apparatus.

In an example, resonance-type wireless power transmission may provide a high degree of freedom, in terms of positions of a source device and a target device. The source device includes a source resonator, and the target device includes a target resonator. As an aspect, magnetic coupling or resonance coupling may be formed between the source resonator and the target resonator. The source device and the target device may communicate with each other. During communications, the transmission or reception of control and state information may occur. A portion of the source device that transmits a wireless power may be referred to as a power transmitter, and a portion of the target device that receives a wireless power may be referred to as a power receiver.

SUMMARY

In one general aspect, there is provided a wireless power receiver including a rectifier including an input and an output, and configured to receive a signal through the input, to rectify the signal to produce a rectified signal, and to output the rectified signal through the output. The wireless power receiver further includes a capacitor connected to the output of the rectifier and to ground. The wireless power receiver further includes a direct current-to-direct current (DC/DC) converter connected to the output of the rectifier and to a load, and configured to convert the rectified signal to a power, and to provide the power to the load. The wireless power receiver further includes a device configured to create a short circuit to protect the rectifier and/or the capacitor when a voltage greater than a threshold voltage is applied to the input of the rectifier and/or the output of the rectifier.

The device is further configured to reduce a voltage applied to the rectifier and/or the capacitor to protect the rectifier and/or the capacitor when the voltage greater than the threshold voltage is applied to the input of the rectifier and/or the output of the rectifier.

The signal is a differential signal. The rectifier further includes another inputs, and is further configured to receive the differential signal through the input and the other input, and to rectify the differential signal to produce the rectified signal. The device is connected between the two inputs of the rectifier.

A capacitance of the device is less than or equal to 50 picofarads (pF).

The rectifier includes a Schottky diode. A breakdown voltage of the device is 3 volts (V) to 5V less than a peak reverse voltage of the Schottky diode.

The device is connected to the capacitor and to the ground.

The DC/DC converter includes a DC/DC buck converter.

In another general aspect, there is provided a wireless power receiver including a rectifier including an input and an output, and configured to receive a signal through the input, to rectify the signal to produce a rectified signal, and to output the rectified signal through the output. The wireless power receiver further includes a capacitor connected to the output of the rectifier and to ground. The wireless power receiver further includes a direct current-to-direct current (DC/DC) converter connected to the output of the rectifier and to a load, and configured to convert the rectified signal to a power, and to provide the power to the load. The wireless power receiver further includes a switch unit connected to the input of the rectifier. The wireless power receiver further includes a protection unit configured to control the switch unit to open or close based on a voltage of the rectified signal.

The protection unit is further configured to control the switch unit to close when the voltage of the rectified signal is less than a threshold, to enable the rectifier to receive the signal through the switch unit and the input. The protection unit is further configured to control the switch unit to open when the voltage of the rectified signal is greater than the threshold, to block the rectifier from receiving the signal through the switch unit and the input.

The switch unit includes a p-channel metal-oxide-semiconductor field-effect transistor (PMOSFET) switch.

The protection unit includes a voltage adjustor configured to adjust a voltage of the power to generate a first comparator input signal. The protection unit further includes a first voltage divider configured to divide the voltage of the rectified signal to generate a second comparator input signal. The protection unit further includes a comparator configured to compare the first comparator input signal and the second comparator input signal, and to output a comparator output signal based on a result the comparison. The protection unit further includes a second voltage divider configured to divide a voltage of the comparator output signal to generate a switch control signal to control the switch unit to open or close.

The comparator includes a positive input connected to the first voltage divider to receive the second comparator input signal, a negative input connected to the voltage adjustor to receive the first comparator input signal, and an output to output the comparator output signal. The first voltage divider includes a first resistor connected to the positive input of the comparator and to the output of the rectifier, and a second resistor connected to the positive input of the comparator and to the ground. The second voltage divider includes a third resistor connected to the switch unit and to the output of the comparator, and a fourth resistor connected to the output of the comparator and to the ground.

The power charges the load. The protection unit is further configured to output the switch control signal to control the switch unit to close while the load is being charged. The protection unit is further configured to output the switch control signal to control the switch unit to open when the load is fully charged.

The wireless power receiver further includes a communication/control unit configured to receive, from the protection unit, the switch control signal, and transmit, to a wireless power transmitter that transmits the signal to the rectifier, a power transmission suspension signal based on the switch control signal.

The power charges the load. The protection unit is further configured to generate the switch control signal to include a first value when the load is being charged, and a second value when the load is fully charged. The communication/control unit is further configured to transmit the power transmission suspension signal when the switch control signal changes between the first value and the second value, a N number of times, N being an integer greater than or equal to 1.

In another general aspect, there is provided a method of receiving a wireless power, including rectifying a signal received from a resonator. The method further includes converting the rectified signal to a power, and providing the power to a load. The method further includes providing or blocking the rectifying of the signal, based on a voltage of the rectified signal.

The providing or blocking of the rectifying of the signal includes adjusting a voltage of the power to generate a first comparator input signal, dividing a voltage of the rectified signal to generate a second comparator input signal, comparing the first comparator input signal and the second comparator input signal to output a comparator output signal based on a result the comparison, and dividing a voltage of the comparator output signal to generate a switch control signal to provide or block the rectifying of the signal.

The method further includes transmitting, to a wireless power transmitter that transmits the signal to the resonator, a power transmission suspension signal based on the switch control signal.

The power charges the load. The switch control signal includes a first value when the load is being charged, and a second value when the load is fully charged. The transmitting of the power transmission suspension signal includes counting a number of times the switch control signal changes between the first value and the second value, and transmitting the power transmission suspension signal when the number of times the switch control signal changes is greater than or equal to N, N being an integer greater than or equal to 1.

A non-transitory computer-readable storage medium stores a program including instructions to cause a computer to perform the method.

Other features and aspects may be apparent from the following detailed description, the drawings, and the claims.

Figure 1:
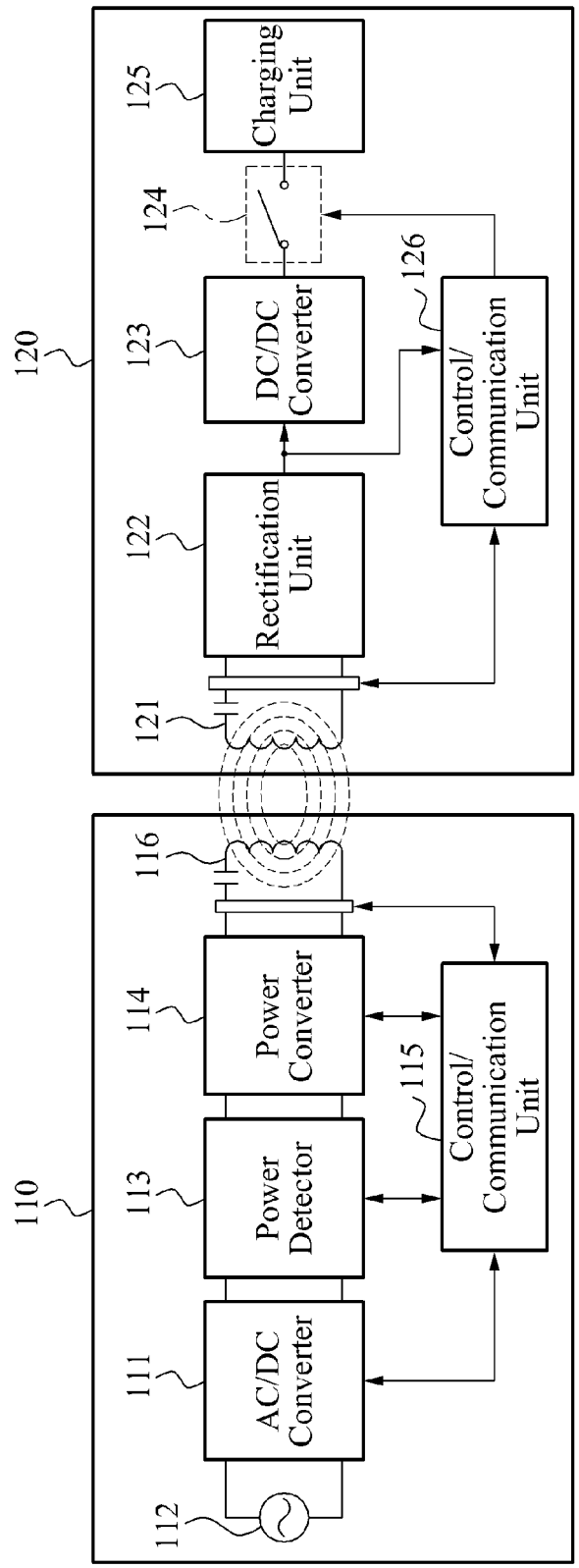
FIG. 1 is a diagram illustrating an example of a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

A method of protecting a power receiver, including a load, in resonance-type wireless power transmission will be described hereinafter. The load may correspond to a battery. Herein, the terms "load", "battery", and "load battery" may be used to denote the same meaning, and may be interchangeable with one another. The load may include a charger circuit for a safe charging operation. The charger circuit may adjust conditions of a voltage and a current, depending on an initial charging period, a period during which charging is being performed, a period during which full charging is completed, and/or the like. Also, when the load is fully charged, a protection circuit module (PCM) blockage mode may be operated, and a path to the load may be blocked. The blockage may result in a change in an impedance of the load, whereby a high voltage may be applied to a rectifier and a power higher than a power requested by the load may be received. In the following examples, a method of resolving a problem of damages to the rectifier and a rectifier capacitor, which may occur due to a high voltage or a high power, will be provided.

In the following examples, a short-type protection circuit and an open-type protection circuit that may protect a rectification system, will be provided. Also, in the following examples, a full charging sensing method by which a communication signal indicating that a power transmission is to be suspended may be transmitted to a power transmitter when a full charge is sensed, will be provided. In the full charge sensing method, a wireless power reception apparatus may complete a wireless charging process stably.

FIG. 1 illustrates an example of a wireless power transmission system. The wireless power transmission system includes a source device 110 and a target device 120.

The source device 110 includes an alternating current-to-direct current (AC/DC) converter 111, a power detector 113, a power converter 114, a control/communication unit 115, and a source resonator 116. The target device 120 includes a target resonator 121, a rectification unit 122, a DC-to-DC (DC/DC) converter 123, a switch unit 124, a charging unit 125, and a control/communication unit 126.

The AC/DC converter 111 rectifies an AC voltage in a band of tens of hertz (Hz) output from a power supply 112 to generate a DC voltage. The AC/DC converter 111 may output a DC voltage of a predetermined level, or may adjust an output level of a DC voltage based on the control of the control/communication unit 115.

The power detector 113 detects an output current and an output voltage of the AC/DC converter 111, and transfers, to the control/communication unit 115, information on the detected current and the detected voltage. In addition, the power detector 113 detects an input current and an input voltage of the power converter 114.

The power converter 114 uses a switching pulse signal in a band of a few megahertz (MHz) to tens of MHz to convert a DC voltage of a predetermined level to an AC voltage, to generate a power. As an example, the power converter 114 uses a resonance frequency to convert a DC voltage to an AC voltage, and generates a communication power used for communication and/or a charging power used to charge. The communication power and the charging power are used in the target device 120. The communication power may refer to an energy used to activate a communication module and a processor of the target device 120. Accordingly, the communication power may be referred to as a "wake-up power". Additionally, the communication power may be transmitted in the form of a constant wave (CW) for a predetermined period of time. The charging power may refer to an energy used to charge a battery connected to the target device 120 or included in the target device 120. The charging power may continue to be transmitted, at a higher power level than the communication power, for a predetermined period of time. For example, the communication power may have a power level of 0.1 Watt (W) to 1 W, and the charging power may have a power level of 1 W to 20 W.

The control/communication unit 115 may control a frequency of a switching pulse signal. The frequency of the switching pulse signal may be determined under the control of the control/communication unit 115. The control/communication unit 115 may control the power converter 114 to generate a modulation signal to be transmitted to the target device 120. In other words, the control/communication unit 115 may use in-band communication to transmit various messages to the target device 120. Additionally, the control/communication unit 115 may detect a reflected wave, and the control/communication unit 115 may demodulate a signal received from the target device 120 through an envelope of the detected reflected wave.

The control/communication unit 115 may use various schemes to generate a modulation signal for in-band communication. The control/communication unit 115 may turn on or off the switching pulse signal, or may perform delta-sigma modulation, to generate the modulation signal. Additionally, the control/communication unit 115 may generate a pulse-width modulation (PWM) signal with a predetermined envelope.

The control/communication unit 115 may perform out-band communication that employs a separate communication channel, instead of a resonance frequency. The control/communication unit 115 may include a communication module. The communication module may include, for example, a ZigBee module, a Bluetooth module, and/or the like. The control/communication unit 115 may transmit data to the target device 120 using the out-band communication, or receive data from the target device 120 using the out-band communication.

The source resonator 116 transfers an electromagnetic energy to the target resonator 121. As an example, the source resonator 116 transfers, to the target device 120, a communication power used for communication and/or a charging power used to charge, using a magnetic coupling with the target resonator 121.

The target resonator 121 receives the electromagnetic energy from the source resonator 116. As an example, the target resonator 121 receives, from the source device 110, the communication power and/or charging power, using the magnetic coupling with the source resonator 116. As another example, the target resonator 121 may use the in-band communication to receive various messages from the source device 110.

The rectification unit 122 rectifies an AC voltage to generate a DC voltage. In this example, the AC voltage is received from the target resonator 121.

The DC/DC converter 123 adjusts a level of the DC voltage output from the rectification unit 122 based on a capacity of the charging unit 125. For example, the DC/DC converter 123 may adjust to, for example, 3 volt (V) through 10 V, the level of the DC voltage output from the rectification unit 122.

The switch unit 124 is turned on or off under the control of the control/communication unit 126. In response to the switch unit 124 being turned off, the control/communication unit 115 detects a reflected wave. In other words, in response to the switch unit 124 being turned off, the magnetic coupling between the source resonator 116 and the target resonator 121 is substantially reduced.

The charging unit 125 may include a battery. The charging unit 125 may use a DC voltage output from the DC/DC converter 123 to charge the battery.

The control/communication unit 126 may use a resonance frequency to perform in-band communication to transmit and/or receive data. During the in-band communication, the control/communication unit 126 may detect a signal between the target resonator 121 and the rectification unit 122, or detect an output signal of the rectification unit 122 to demodulate a received signal. In other words, the control/communication unit 126 may demodulate a message received using the in-band communication.

As another example, the control/communication unit 126 may adjust an impedance of the target resonator 121 to modulate a signal to be transmitted to the source device 110. As an example, the control/communication unit 126 may turn on or off the switch unit 124 to modulate the signal to be transmitted to the source device 110. For example, the control/communication unit 126 may increase the impedance of the target resonator 121. Based on the increase of the impedance of the target resonator 121, a reflected wave may be detected in the control/communication unit 115. In this example, depending on whether the reflected wave is detected, the control/communication unit 115 may detect a binary number "0" or "1".

The control/communication unit 126 may also perform out-band communication that employs a communication channel. The control/communication unit 126 may include a communication module. The communication module may include, for example, a ZigBee module, a Bluetooth module, and/or the like. The control/communication unit 126 may transmit, to the source device 110, using the out-band communication, or receive data, from the source device 110, using the out-band communication.

Figure 2:
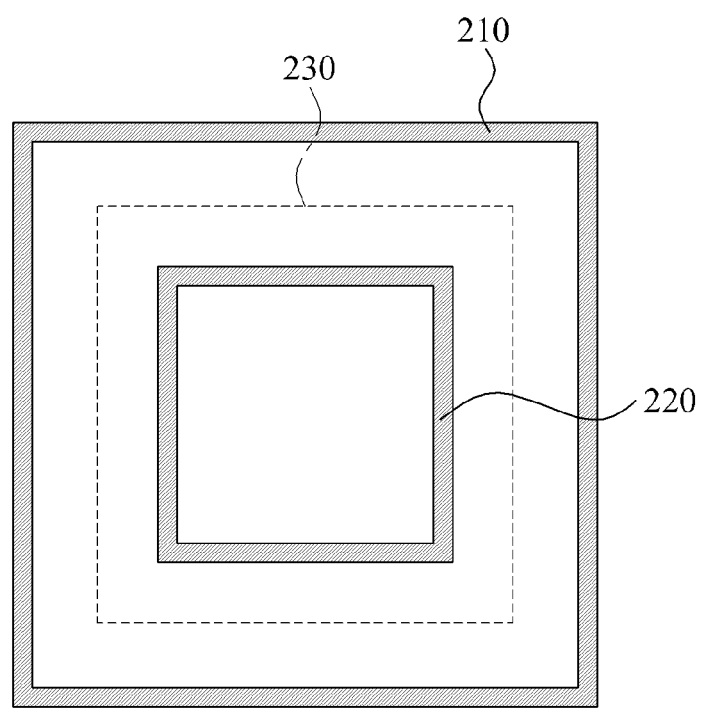
FIG. 2 is a diagram illustrating an example of a wireless power transmitter.

FIG. 2 illustrates an example of a wireless power transmitter. The wireless power transmitter includes a source resonator 210, a sub-resonator 220, and a magnetic field distribution controller 230.

The source resonator 210 forms a magnetic coupling with a target resonator. The source resonator 210 wirelessly transmits power to a target device through the magnetic coupling. The source resonator 210 may have a loop shape as illustrated in FIG. 2. In examples, the loop shape may be implemented in various shapes. For example, the shapes may include a spiral shape, a helical shape, and/or the like.

Additionally, the wireless power transmitter may include a matcher (not illustrated) to be used in impedance matching. The matcher may adjust a strength of a magnetic field of the source resonator 210 to an appropriate level. An impedance of the source resonator 210 may be determined by the matcher. The matcher may have the same shape as the source resonator 210. Additionally, the matcher may have a predetermined location relationship with a capacitor located in the source resonator 210 to adjust the strength of the magnetic field. For example, the matcher may be electrically connected to the source resonator 210 in both ends of the capacitor.

As an example, the matcher may be located within a loop of the loop structure of the source resonator 210. The matcher may change the physical shape of the matcher to adjust the impedance of the source resonator 210.

The sub-resonator 220 is located within the source resonator 210. A plurality of sub-resonators may be located within the source resonator 210. Additionally, a sub-sub-resonator may be located within the sub-resonator 220. The sub-resonator 220 influences a distribution of a magnetic field formed within the source resonator 210. For example, a current flowing in the source resonator 210 forms a magnetic field, and the formed magnetic field induces a current to the sub-resonator 220. In this example, a distribution of the magnetic field formed within the source resonator 210 is determined based on a direction of the current flowing in the source resonator 210 and in the sub-resonator 220. As another example, the direction of the current flowing in the sub-resonator 220 is determined based on a ratio of a resonance frequency of the sub-resonator 220 to a resonance frequency of the source resonator 210.

The resonance frequency of the source resonator 210 is related to an inductance value L and a capacitance value C of the source resonator 210. Similarly, the resonance frequency of the sub-resonator 220 is related to an inductance value and a capacitance value of the sub-resonator 220.

The magnetic field distribution controller 230 is located in a predetermined area within the source resonator 210. The magnetic field distribution controller 230 controls the direction of the current flowing in the source resonator 210 or in the sub-resonator 220. The magnetic field distribution controller 230 controls the distribution of the magnetic field formed within the source resonator 210. The direction of the current flowing in the source resonator 210, or the direction of the current flowing in the sub-resonator 220, are related to the ratio of the resonance frequency of the sub-resonator 220 to the resonance frequency of the source resonator 210.

The magnetic field distribution controller 230 controls the resonance frequency of the source resonator 210, or the resonance frequency of the sub-resonator 220. As an example, the magnetic field distribution controller 230 controls the resonance frequency of the source resonator 210 based on changing the capacitance of the source resonator 210. As another example, the magnetic field distribution controller 230 controls the resonance frequency of the sub-resonator 220 based on adjusting the capacitance and the inductance of the sub-resonator 220. The magnetic field distribution controller 230 adjusts a length and a width of a line that forms the sub-resonator 220 to control the inductance value of the sub-resonator 220.

The magnetic field distribution controller 230 controls the direction of the current flowing in the source resonator 210, or the direction of the current flowing in the sub-resonator 220, so that the strength of the magnetic field formed within the source resonator 210 may be increased or decreased.

As another example, the magnetic field distribution controller 230 controls the distribution of the magnetic field, so that the magnetic field is uniformly distributed in the source resonator 210. As another example, the magnetic field distribution controller 230 controls the resonance frequency of the sub-resonator 220, and the magnetic field to be uniformly distributed in the source resonator 210. The configuration of the sub-resonator 220 will be further described with reference to FIG. 8.

The magnetic field distribution controller 230 may use a sub-sub-resonator to control the distribution of the magnetic field formed within the source resonator 210. The magnetic field distribution controller 230 may control a resonance frequency of the sub-sub-resonator, and may compensate for the uniform distribution of the magnetic field formed within the source resonator 210. The magnetic field distribution controller 230 may control the direction of the current flowing in the sub-resonator 220, a direction of a current flowing in the sub-sub-resonator, and the distribution of the magnetic field. The sub-sub-resonator may be located in the sub-resonator 220. The sub-sub-resonator may support the sub-resonator 220, and may compensate for the distribution of the magnetic field formed within the source resonator 210, so that the magnetic field may be uniformly distributed. The sub-sub-resonator may compensate for the distribution of the magnetic field adjusted by the sub-resonator 220, so that the magnetic field may be uniformly distributed in the source resonator 210.

The magnetic field distribution controller 230 may include at least one coil. The coil may be used to induce the magnetic field formed within the source resonator 210 towards the center of the source resonator 210. As another example, the magnetic field distribution controller 230 may use the coil to control the magnetic field formed within the source resonator 210 to be uniformly distributed. The magnetic field distribution controller 230 may control a resonance frequency of the coil, so that a current may flow in the coil in the same direction as the current flowing in the source resonator 210.

In an example, at least one coil may be located in the center of the source resonator 210, and the coil may form at least one loop structure with different sizes. The magnetic field distribution controller 230 may use the coil of various sizes to more precisely control the magnetic field formed within the source resonator 210.

In another example, at least one coil having the same shape as another coil may be located in a predetermined position within the source resonator 210. The coil having the same shape as another coil may be located in various areas within the source resonator 210. Under the control of the magnetic field distribution controller 230, the coil having the same shape as another coil may increase or decrease the strength of the magnetic field formed within the source resonator 210 in the various areas in which the coil having the same shape as another coil is located.

In yet another example, the coil may be located in the center of the source resonator 210. The coil may be formed in a spiral shape. As another example, the coil may be formed with various shapes, and coil may adjust the magnetic field formed within the source resonator 210.

The magnetic field distribution controller 230 may include a plurality of shielding layers. The shielding layers may have different sizes and heights located at the center of the source resonator 210, and may have a loop structure. Due to the shielding layers being located at the center of the source resonator 210 and having the loop structure, the magnetic field distribution controller 230 may induce the magnetic field formed within the source resonator 210 to be uniformly distributed. A magnetic flux of the magnetic field formed within the source resonator 210 may be refracted from the shielding layers, and the magnetic flux of the magnetic field may be more concentrated on the center of the source resonator 210.

The magnetic field distribution controller 230 may include, for example, a layer formed of a mu negative (MNG) material, a double negative (DNG) material, or a magneto-dielectric material. The magnetic field distribution controller 230 may refract the magnetic flux of the magnetic field formed within the source resonator 210, based on the layer, and may induce the magnetic field to be uniformly distributed in the source resonator 210.

The magnetic field distribution controller 230 may adjust widths of the shielding layers laminated in predetermined positions of the source resonator 210 and the sub-resonator 220, and may induce the magnetic field to be uniformly distributed within the source resonator 210. Based on the widths of the shielding layers, a refractive level of the magnetic flux of the magnetic field formed within the source resonator 210, may be changed. Accordingly, the magnetic field distribution controller 230 may adjust the widths of the shielding layers to control the magnetic field to be uniformly distributed within the source resonator 210.

A target device may be located on the source resonator 210 of a pad type. In this example, a gap between the source resonator 210 and the target device may be less than a 2 or 3 centimeters (cm). Accordingly, a parasitic capacitor may be formed between the source resonator 210 and the target device. The parasitic capacitor may influence the resonance frequency of the source resonator 210. The magnetic field distribution controller 230 may adjust widths and thicknesses of the shielding layers laminated in predetermined positions of the source resonator 210 and the sub-resonator 220, and may offset a change in the resonance frequency of the source resonator 210 due to the parasitic capacitor.

Figure 3:
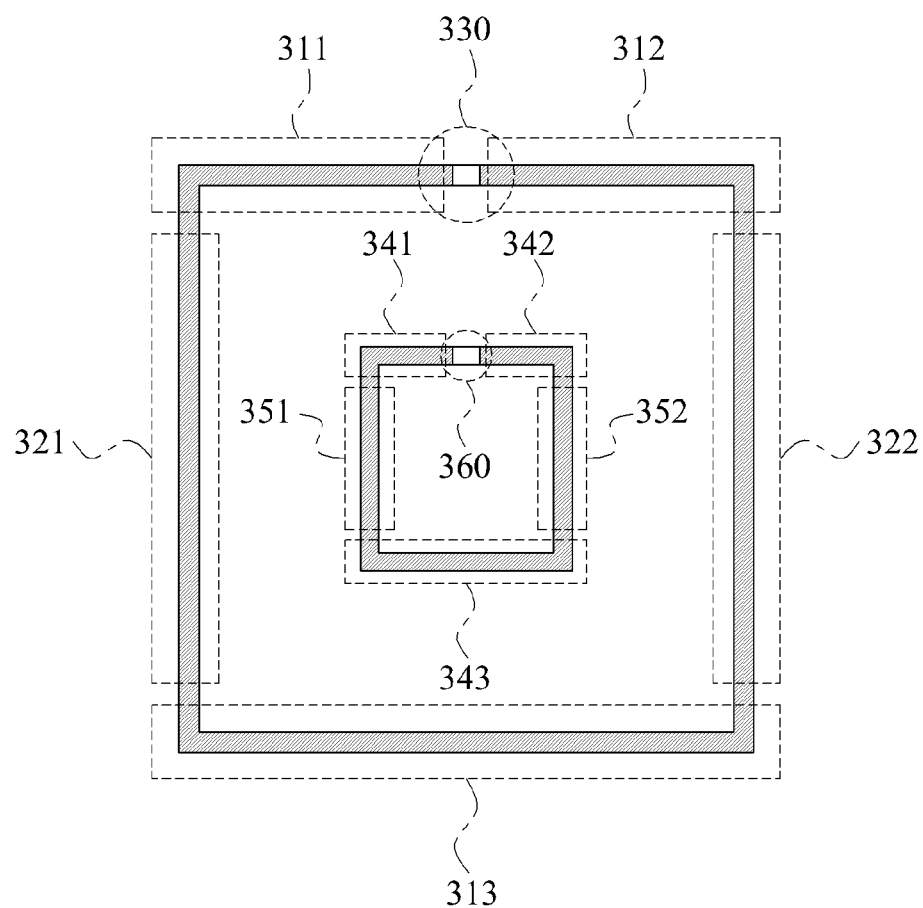
FIG. 3 is a diagram illustrating another example of a wireless power transmitter.

FIG. 3 illustrates an example of a wireless power transmitter 300, e.g., a source resonator. The source resonator may form a magnetic coupling with a target resonator. The source resonator may wirelessly transmit a power to the target device via the magnetic coupling. The source resonator includes a first transmission line, a first conductor 321, a second conductor 322, and at least one first capacitor 330.

The first capacitor 330 is inserted in series between a first signal conducting portion 311 and a second signal conducting portion 312 in the first transmission line. An electric field is confined to be within the first capacitor 330. For example, the first transmission line may include at least one conductor in an upper portion of the first transmission line, may also include at least one conductor in a lower portion of the first transmission line. Current may flow through the at least one conductor disposed in the upper portion of the first transmission line. The at least one conductor disposed in the lower portion of the first transmission line may be electrically grounded. For example, a conductor disposed in an upper portion of the first transmission line may be separated into the first signal conducting portion 311 and the second signal conducting portion 312. A conductor disposed in a lower portion of the first transmission line may be referred to as a first ground conducting portion 313.

The source resonator of FIG. 3 has a two-dimensional (2D) structure. The first transmission line includes the first signal conducting portion 311 and the second signal conducting portion 312. The first signal conducting portion 311 and the second signal conducting portion 312 are located in the upper portion of the first transmission line. In addition, the first transmission line includes the first ground conducting portion 313 in the lower portion of the first transmission line. The first signal conducting portion 311 and the second signal conducting portion 312 face the first ground conducting portion 313. The current flows through the first signal conducting portion 311 and the second signal conducting portion 312.

As one example, one end of the first signal conducting portion 311 is connected to the first conductor 321. One end of the second signal conducting portion 312 is connected to the second conductor 322. The other ends of the first signal conducting portion 311 and the second signal conducting portion 312 are both connected to the first capacitor 330. Accordingly, the first signal conducting portion 311, the second signal conducting portion 312, the first ground conducting portion 313, and the conductors 321 and 322 are connected to each other. Thus, the source resonator has an electrically closed-loop structure. The term "loop structure" may have, for example, a polygonal structure, such as a circular structure, a rectangular structure, and/or the like. "Having a loop structure" may indicate that the circuit is electrically closed.

The first capacitor 330 is inserted into an intermediate portion of the first transmission line. For example, the first capacitor 330 is inserted into a space between the first signal conducting portion 311 and the second signal conducting portion 312. The first capacitor 330 may have a shape corresponding to a lumped element, a distributed element, and/or the like. For example, a distributed capacitor having the shape of the distributed element may include zigzagged conductor lines and a dielectric material having a high permittivity between the zigzagged conductor lines.

In response to the first capacitor 330 being inserted into the first transmission line instead of the space between the first signal conducting portion 311 and the second signal conducting portion 312, the source resonator may have a characteristic of a metamaterial. The metamaterial may indicate a material having a predetermined electrical property that has not been discovered in nature, and thus, the meta material may have an artificially designed structure. An electromagnetic characteristic of the materials existing in nature may have a unique magnetic permeability or a unique permittivity. Most materials may have a positive magnetic permeability or a positive permittivity.

In the case of most materials, a right hand rule may be applied to an electric field, a magnetic field, and a Poynting vector, and thus, the corresponding materials having the right hand rule applied may be referred to as right handed materials (RHMs). As another example, the metamaterial having a magnetic permeability or a permittivity absent in nature may be classified into an epsilon negative (ENG) material, an MNG material, a DNG material, a negative refractive index (NRI) material, a left-handed (LH) material, and/or the like. The classification may be based on a sign of the corresponding permittivity or magnetic permeability.

In response to a capacitance of the first capacitor 330 inserted as the lumped element being appropriately determined, the source resonator may have the characteristic of the metamaterial. The source resonator may have a negative magnetic permeability based on an adjustment of the capacitance of the first capacitor 330. Thus, the source resonator may also be referred to as an MNG resonator. Various criteria may be used to determine the capacitance of the first capacitor 330. For example, the various criteria may include a criterion configured to enable the source resonator to have the characteristic of the metamaterial, a criterion configured to enable the source resonator to have a negative magnetic permeability in a target frequency, a criterion configured to enable the source resonator to have a zeroth order resonance characteristic in the target frequency, and/or the like. Based on any combination of the aforementioned criteria, the capacitance of the first capacitor 330 may be determined.

The source resonator, also referred to as the MNG resonator, may have a zeroth order resonance characteristic. The zeroth order resonance characteristic may have, as a resonance frequency, a frequency where a propagation constant is "0". Because the source resonator may have the zeroth order resonance characteristic, the resonance frequency may be independent of a physical size of the MNG resonator. The MNG resonator may change the resonance frequency based on an appropriate design of the first capacitor 330. Accordingly, the physical size of the MNG resonator may not be changed.

In a near field, an electric field may be concentrated on the first capacitor 330 inserted into the first transmission line. Accordingly, due to the first capacitor 330, the magnetic field may become dominant in the near field. The MNG resonator may have a relatively high Q-factor using the first capacitor 330 of the lumped element, and thus, an enhancement of an efficiency of power transmission may be possible. For example, the Q-factor may indicate a level of an ohmic loss, or a ratio of a reactance with respect to a resistance in the wireless power transmission. The efficiency of the wireless power transmission may increase corresponding to an increase in the Q-factor.

Although not illustrated in FIG. 3, a magnetic core may be provided to pass through the MNG resonator. The magnetic core may increase a power transmission distance.

Referring to FIG. 3, a sub-resonator includes a second transmission line, a third conductor 351, a fourth conductor 352, and at least one second capacitor 360. The second capacitor 360 is inserted between a third signal conducting portion 341 and a fourth signal conducting portion 342 in the second transmission line, and an electric field is confined to be within the second capacitor 360. As an example, the second capacitor 360 is located in series between the third signal conducting portion 341 and the fourth signal conducting portion 342.

As illustrated in FIG. 3, the sub-resonator has a 2D structure. The second transmission line includes the third signal conducting portion 341 and the fourth signal conducting portion 342 in an upper portion of the second transmission line. In addition, the second transmission line includes a second ground conducting portion 343 in a lower portion of the second transmission line. The third signal conducting portion 341 and the fourth signal conducting portion 342 faces the second ground conducting portion 343. Current flows through the third signal conducting portion 341 and the fourth signal conducting portion 342.

As another example, one end of the third signal conducting portion 341 is connected to the third conductor 351, and the other end of the third signal conducting portion 341 is connected to the second capacitor 360. One end of the fourth signal conducting portion 342 is connected to the fourth conductor 352, and the other end of the fourth signal conducting portion 342 is connected to the second capacitor 360. Accordingly, the third signal conducting portion 341, the fourth signal conducting portion 342, the second ground conducting portion 343, the third conductor 351, and the fourth conductor 352 is connected to each other. Thus, the sub-resonator has an electrically closed-loop structure. The term "loop structure" may refer to, for example, a polygonal structure, such as a circular structure, a rectangular structure, and/or the like. The second transmission line, the third conductor 351, and the fourth conductor 352 may form, for example, a rectangular loop structure, a circular loop structure, or a crossed loop structure.

A magnetic field distribution controller may adjust a resonance frequency of at least one sub-resonator based on a value of the second capacitor 360, and a length and width of the second transmission line. Thus, the resonance frequency of the sub-resonator may differ from a resonance frequency of the source resonator by a predetermined value.

The magnetic field distribution controller may adjust the value of the second capacitor 360. For example, in response to the value of the second capacitor 360 being changed, the resonance frequency of the sub-resonator may also be changed. Accordingly, the magnetic field distribution controller may adjust the value of the second capacitor 360 to adjust the resonance frequency of the sub-resonator to be greater than or less than the resonance frequency of the source resonator. The magnetic field distribution controller may adjust the resonance frequency of the sub-resonator to be greater than or less than the resonance frequency of the source resonator, so that a magnetic field formed in the center of the source resonator may have substantially the same strength as a magnetic field formed outside the source resonator.

FIGS. 4 through 8 illustrate examples of resonators. A source resonator included in a wireless power transmitter may have a structure as illustrated in FIGS. 4 through 8.

Figure 4:
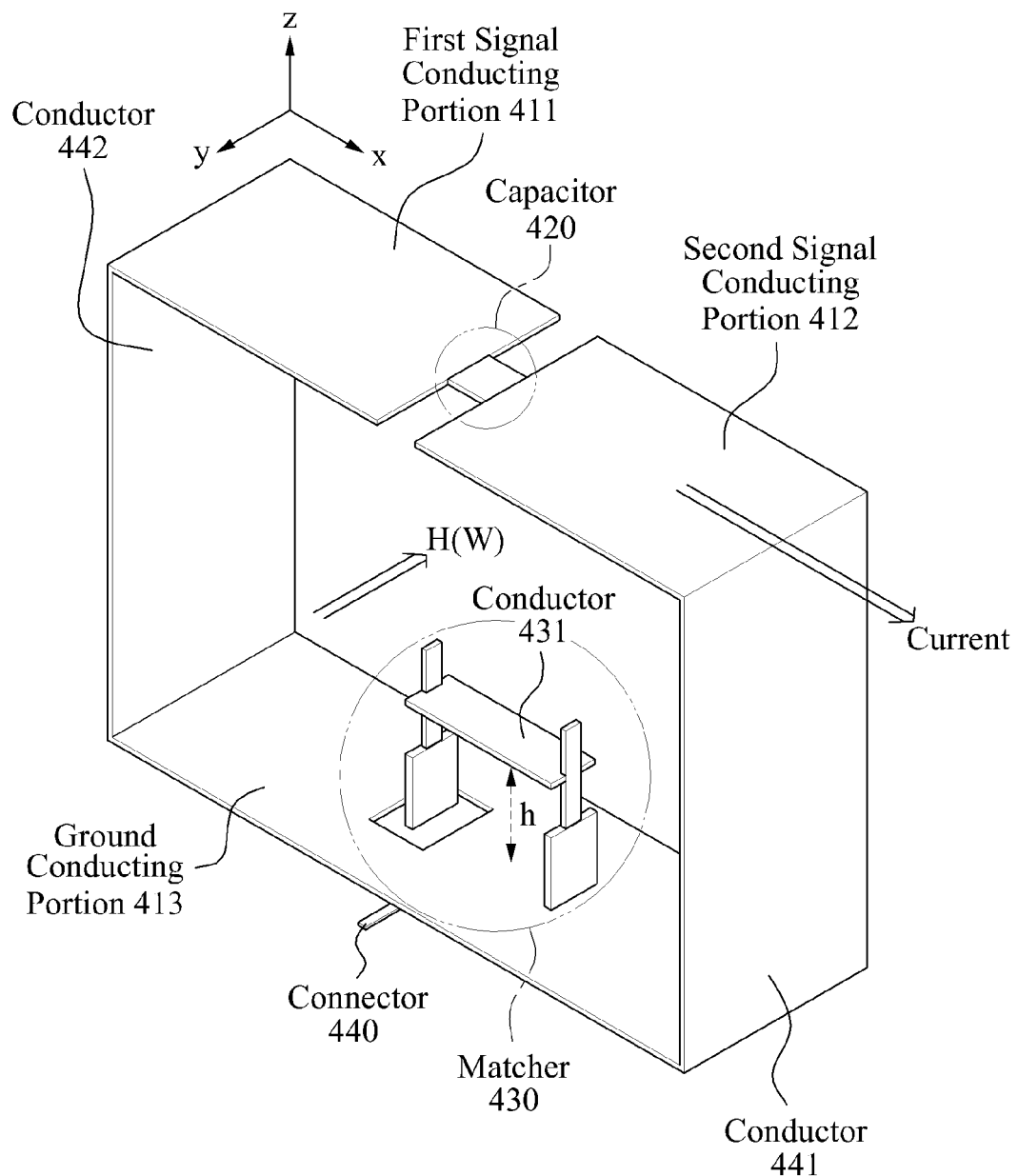
FIGS. 4 through 8 are diagrams illustrating examples of resonators.

FIG. 4 illustrates an example of a resonator 400 having a three-dimensional (3D) structure. The resonator 400 includes a transmission line and a capacitor 420. The transmission line includes a first signal conducting portion 411, a second signal conducting portion 412, and a ground conducting portion 413. The capacitor 420 is located in series between the first signal conducting portion 411 and the second signal conducting portion 412 of the transmission line. An electric field is confined within the capacitor 420.

As illustrated in FIG. 4, the resonator 400 has the 3D structure. The transmission line includes the first signal conducting portion 411 and the second signal conducting portion 412 in an upper portion of the resonator 400, and the resonator 400 includes the ground conducting portion 413 in a lower portion of the resonator 400. The first signal conducting portion 411 and the second signal conducting portion 412 face the ground conducting portion 413. For example, current flows in an x-direction through the first signal conducting portion 411 and the second signal conducting portion 412. Due to the current, a magnetic field H(W) is formed in a −y-direction. As another example, unlike the diagram of FIG. 4, the magnetic field H(W) may be formed in a +y direction.

One end of the first signal conducting portion 411 is connected to a conductor 442, and the other end of the first signal conducting portion 411 is connected to the capacitor 420. One end of the second signal conducting portion 412 is grounded to a conductor 441, and the other end of the second signal conducting portion 412 is connected to the capacitor 420. Accordingly, the first signal conducting portion 411, the second signal conducting portion 412, the ground conducting portion 413, and the conductors 441 and 442 are connected to each other. Thus, the resonator 400 has an electrically closed-loop structure. The term "loop structure" may refer to a polygonal structure, such as, for example, a circular structure, a rectangular structure, and/or the like. "Having a loop structure" may indicate being electrically closed.

The capacitor 420 is inserted between the first signal conducting portion 411 and the second signal conducting portion 412. The capacitor 420 may have a shape of a lumped element, a distributed element, and/or the like. As an example, a distributed capacitor having the shape of the distributed element may include zigzagged conductor lines, and the distributed capacitor may have a dielectric material having a relatively high permittivity located between the zigzagged conductor lines.

The resonator 400, having the capacitor 420 inserted into the transmission line, may have a metamaterial property. In response to a capacitance of the capacitor inserted as the lumped element being appropriately determined, the resonator 400 may have the characteristic of the metamaterial. Because the resonator 400 may appropriately adjust the capacitance of the capacitor 420 to have a negative magnetic permeability, the resonator 400 may also be referred to as an MNG resonator. Various criteria may be applied to determine the capacitance of the capacitor 420. For example, a criterion configured to enable the resonator 400 to have the characteristic of the metamaterial, a criterion configured to enable the resonator 400 to have a negative magnetic permeability in a target frequency, a criterion configured to enable the resonator 400 to have a zeroth order resonance characteristic in the target frequency, and/or the like, may be applied. The capacitance of the capacitor 420 may be determined based on at least one criterion among the aforementioned criteria.

The resonator 400, also referred to as the MNG resonator 400, may have a zeroth order resonance characteristic having, as a resonance frequency, a frequency where a propagation constant is "0". Because the resonator 400 may have the zeroth order resonance characteristic, the resonance frequency may be independent of a physical size of the MNG resonator 400. The MNG resonator 400 may appropriately design the capacitor 420 to change the resonance frequency. Accordingly, the physical size of the MNG resonator 400 may not be changed.

Referring to the MNG resonator 400 of FIG. 4, in a near field, the electric field may be concentrated on the capacitor 420 inserted into the transmission line. Accordingly, the magnetic field may become dominant in the near field due to the capacitor 420. For example, because the MNG resonator 400 having the zeroth-order resonance characteristic may have characteristics similar to a magnetic dipole, the magnetic field may become dominant in the near field. A relatively small amount of the electric field formed due to the insertion of the capacitor 420 may be concentrated on the capacitor 420, and thus, the magnetic field may become further dominant. The MNG resonator 400 may have a relatively high Q-factor using the capacitor 420 of the lumped element. Thus, enhancement of an efficiency of power transmission is possible.

Also, the MNG resonator 400 includes a matcher 430 configured to perform impedance matching. The matcher 430 appropriately adjusts the strength of magnetic field of the MNG resonator 400. The matcher 430 determines an impedance of the MNG resonator 400. Current flows into and/or out of the MNG resonator 400 via a connector 440 connected to the ground conducting portion 413 or the matcher 430.

For example, as shown in FIG. 4, the matcher 430 is positioned within the loop of the loop structure of the resonator 400. The matcher 430 changes the physical shape of the matcher 430 to adjust the impedance of the resonator 400. For example, the matcher 430 includes a conductor 431 in a location separate from the ground conducting portion 413 by a distance h. Adjusting the distance h changes the impedance of the resonator 400.

Although not illustrated in FIG. 4, a controller may control the matcher 430. For example, the physical shape of the matcher 430 may be changed based on a control signal generated by the controller. For example, the control signal may increase or decrease the distance h between the conductor 431 of the matcher 430 and the ground conducting portion 413. Accordingly, the physical shape of the matcher 430 may be changed to adjust the impedance of the resonator 400. The distance h between the conductor 431 and the ground conducting portion 413 may be adjusted using a variety of schemes. As one example, the matcher 430 may include a plurality of conductors, and the distance h may be adjusted by adaptively activating one of the conductors. As another example, adjusting the physical location of the conductor 431 up and down may adjust the distance h. The distance h may be controlled based on the control signal of the controller. The controller may generate the control signal using various factors.

As shown in FIG. 4, the matcher 430 is configured as a passive element, such as the conductor 431. Depending on examples, the matcher 430 may be configured as an active element. The active element may be a diode, a transistor, and/or the like. In response to the active element being included in the matcher 430, the active element may be driven based on the control signal generated by the controller, and the impedance of the resonator 400 may be adjusted based on the control signal. For example, a diode may be included in the matcher 430, where the diode is a type of active element. For example, the impedance of the resonator 400 may be adjusted based on whether the state of the diode is in an ON state or an OFF state.

Although not illustrated in FIG. 4, a magnetic core may be provided to pass through the resonator 400 configured as the MNG resonator. The magnetic core may increase a power transmission distance.

Figure 5:
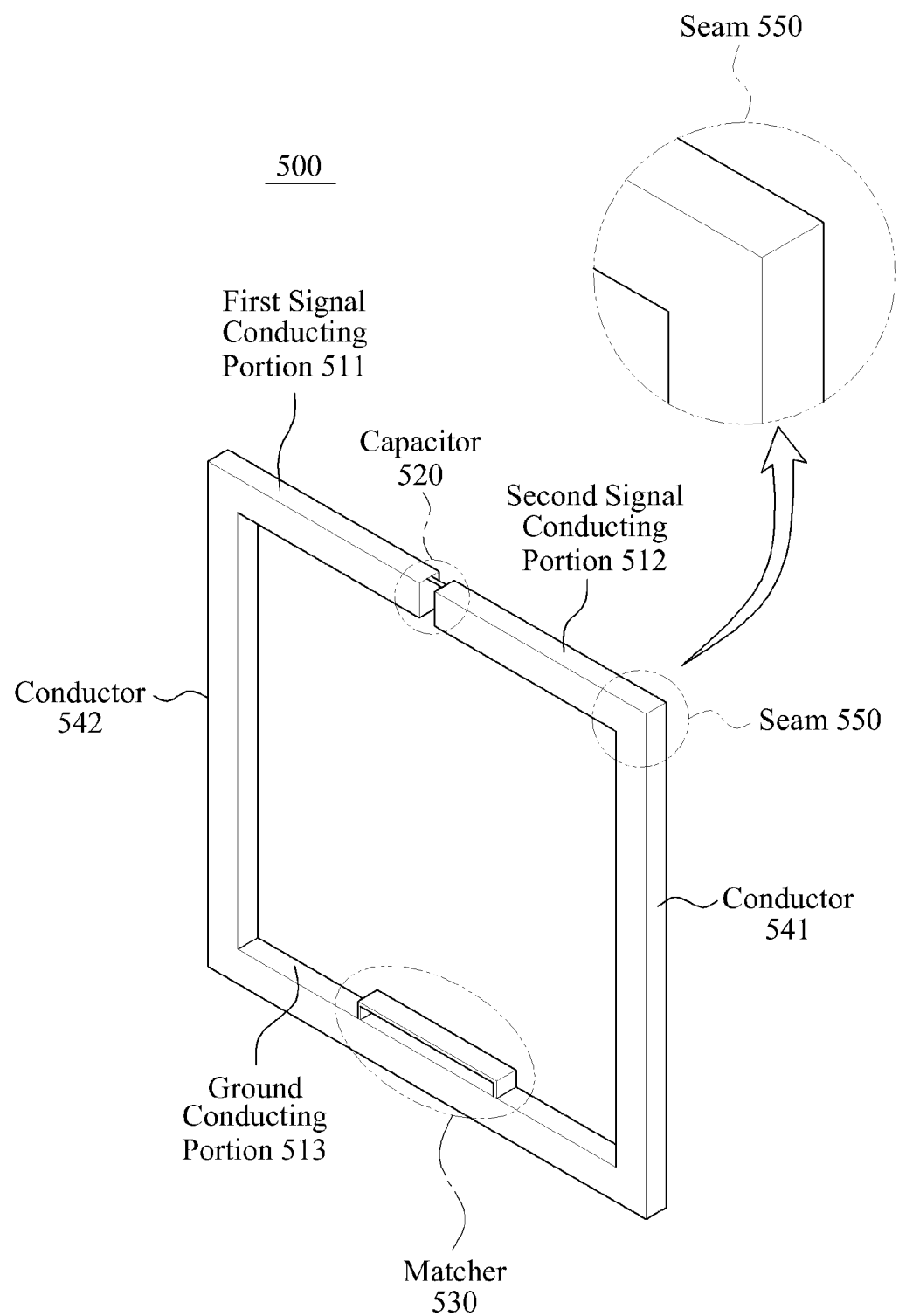

FIG. 5 illustrates an example of a bulky-type resonator 500 for wireless power transmission. A first signal conducting portion 511 and a second signal conducting portion 512 is integrally formed, instead of being separately manufactured and thereafter connected to each other. A capacitor 520 is inserted in a space between the integrally-formed first signal conducting portion 511 and the second signal conducting portion 512.

As another example, the second signal conducting portion 512 and a conductor 541 are integrally manufactured. When the second signal conducting portion 512 and the conductor 541 are separately manufactured and then connected to each other, a loss of conduction may occur at seam 550. In FIG. 5, the second signal conducting portion 512 and the conductor 541 are connected to each other without using a separate seam. In other words, the second signal conducting portion 512 and the conductor 541 are seamlessly connected to each other. Accordingly, a conductor loss caused by the seam 550 is decreased.

As another example, the first signal conducting portion 511 and the conductor 542 are integrally manufactured, and the second signal conducting portion 512 and a ground conducting portion 513 (e.g., including a matcher 530) are seamlessly and integrally manufactured. As yet another example, the first signal conducting portion 511 and the ground conducting portion 513 are seamlessly and integrally manufactured. Referring to FIG. 5, a type of a seamless connection connecting at least two partitions into an integrated form may be referred to as a bulky-type.

Figure 6:
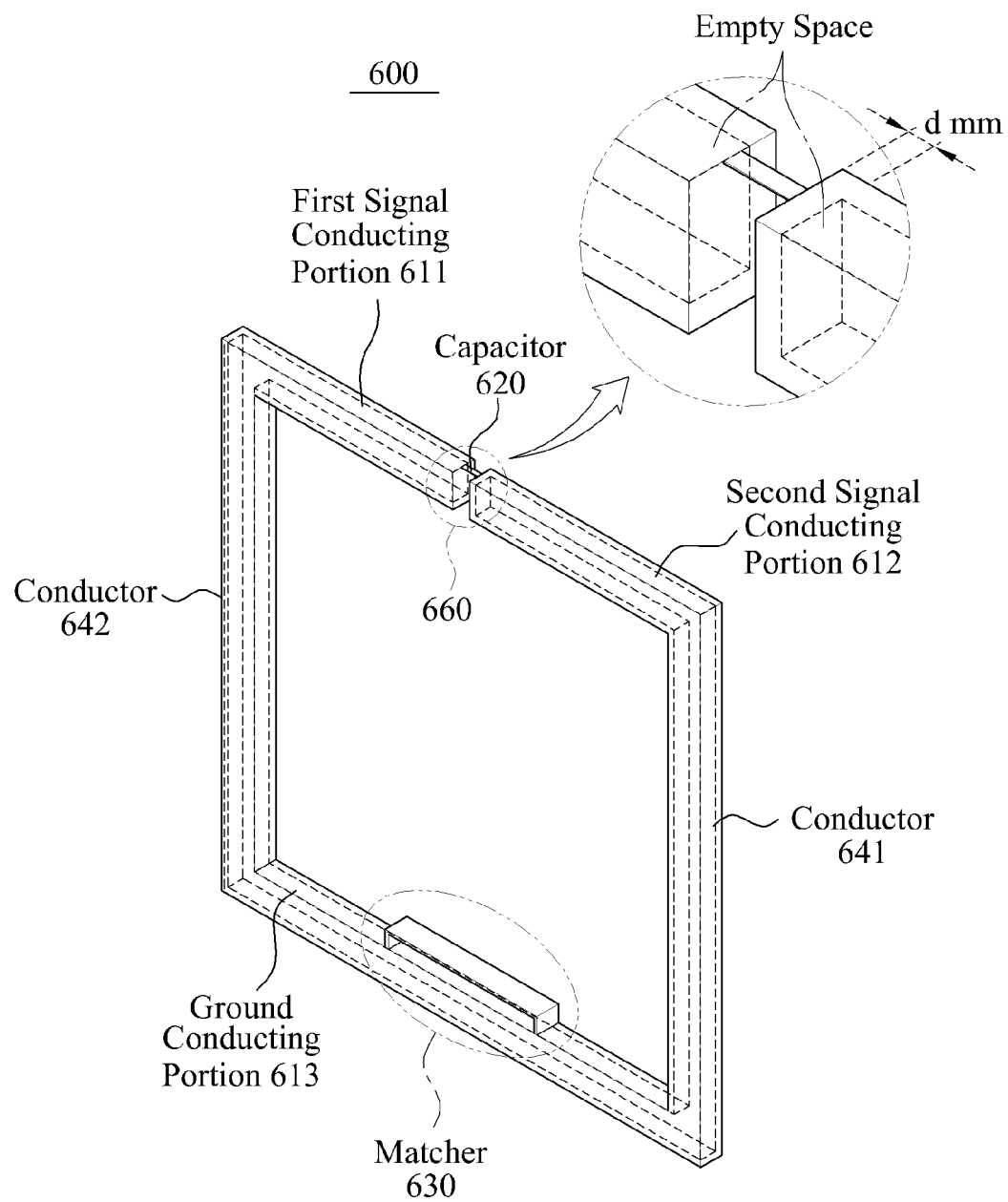

FIG. 6 illustrates an example of a hollow-type resonator 600 for wireless power transmission. Each of a first signal conducting portion 611, a second signal conducting portion 612, a ground conducting portion 613 (including a matcher 630), and conductors 641 and 642 of the hollow-type resonator 600, includes an empty or hollow space inside. A capacitor 620 is placed in a portion 660 between the first signal conducting portion 611 and the second signal conducting portion 612.

For a given resonance frequency, an active current may be modeled to flow in only a portion of the first signal conducting portion 611 instead of the entire first signal conducting portion 611, in only a portion of the second signal conducting portion 612 instead of the entire second signal conducting portion 612, in only a portion of the ground conducting portion 613 instead of the entire ground conducting portion 613, in only a portion of the conductors 641 and 642 instead of the entire conductors 641 and 642, or in any combination thereof. For example, in response to a depth of each of the first signal conducting portion 611, the second signal conducting portion 612, the ground conducting portion 613, and the conductors 641 and 642 being significantly deeper than a corresponding skin depth in the given resonance frequency, the hollow-type resonator 600 may be ineffective. As a result, the significantly deeper depth may increase a weight or manufacturing costs of the resonator 600.

Accordingly, for the given resonance frequency, the depth of each of the first signal conducting portion 611, the second signal conducting portion 612, the ground conducting portion 613, and the conductors 641 and 642 is determined based on the corresponding skin depth of each of the first signal conducting portion 611, the second signal conducting portion 612, the ground conducting portion 613, and the conductors 641 and 642. In response to each of the first signal conducting portion 611, the second signal conducting portion 612, the ground conducting portion 613, and the conductors 641 and 642 having an appropriate depth deeper than a corresponding skin depth, the resonator 600 is lighter in weight, and manufacturing costs of the resonator 600 may also decrease.

For example, as shown in the portion 660, the depth of the second signal conducting portion 612 is d mm, and d is calculated according to $$d = \frac{1}{\sqrt{\pi f \mu \sigma}}.$$

In this example, f corresponds with a resonance frequency, $\mu$ corresponds with a magnetic permeability, and $\sigma$ corresponds with a conductor constant (e.g., conductivity), of a corresponding conducting portion. For example, in response to the first signal conducting portion 611, the second signal conducting portion 612, the ground conducting portion 613, and the conductors 641 and 642 being made of copper having a magnetic permeability of $1.257 \times 10^{-6}$ henries per meter (H·m$^{-1}$) and a conductivity of $5.8 \times 10^7$ siemens per meter (S·m$^{-1}$), the skin depth may be about 0.6 mm with respect to 10 kHz of the resonance frequency, and the skin depth may be about 0.006 mm with respect to 100 MHz of the resonance frequency. These values are merely examples, and other values may be used depending on the situation.

Figure 7:
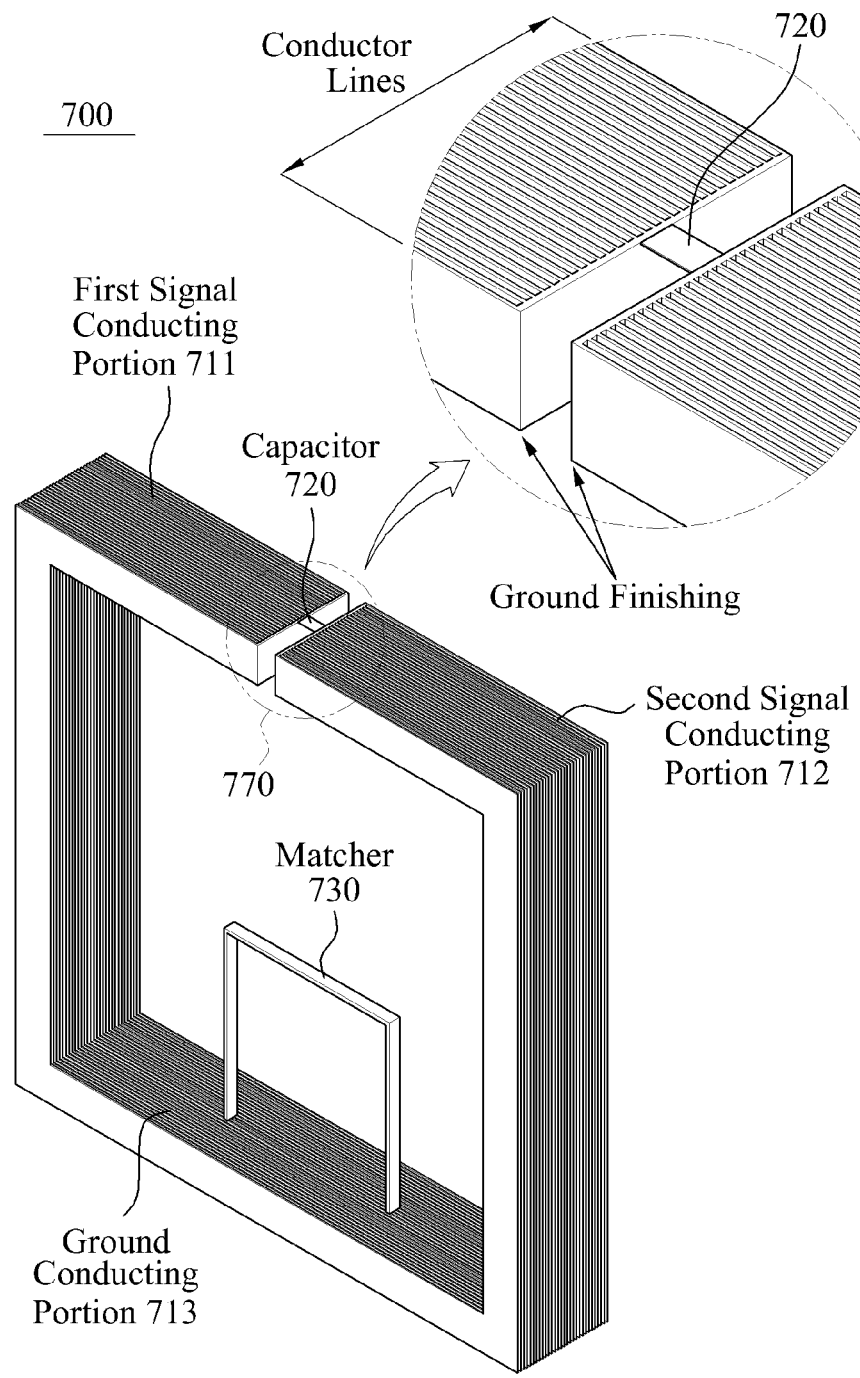

FIG. 7 illustrates a resonator 700 for wireless power transmission using a parallel-sheet. The parallel-sheet is applied to each of a first signal conducting portion 711 and a second signal conducting portion 712 included in the resonator 700. The resonator 700 further includes a ground conducting portion 713, a capacitor 720 disposed in a portion 770 between the first signal conducting portion 711 and the second signal conducting portion 712, and a matcher 730 disposed on the ground conducting portion 713.

Each of the first signal conducting portion 711 and the second signal conducting portion 712 may have a resistance. Thus, the first signal conducting portion 711 and the second signal conducting portion 712 may not be a perfect conductor. Due to the resistance, an ohmic loss may occur, which may decrease a Q-factor and also a coupling effect of the resonator 700.

By applying the parallel-sheet to each of the first signal conducting portion 711 and the second signal conducting portion 712, a decrease in the ohmic loss, and an increase in the Q-factor and the coupling effect is possible. Referring to the portion 770 indicated by a circle, in response to the parallel-sheet being applied, each of the first signal conducting portion 711 and the second signal conducting portion 712 includes a plurality of conductor lines. For example, the plurality of conductor lines are disposed in parallel, and are connected at an end portion of each of the first signal conducting portion 711 and the second signal conducting portion 712. Accordingly, a sum of resistances having the conductor lines is decreased. In addition, the resistance loss decreases, and the Q-factor and the coupling effect increases.

Figure 8:
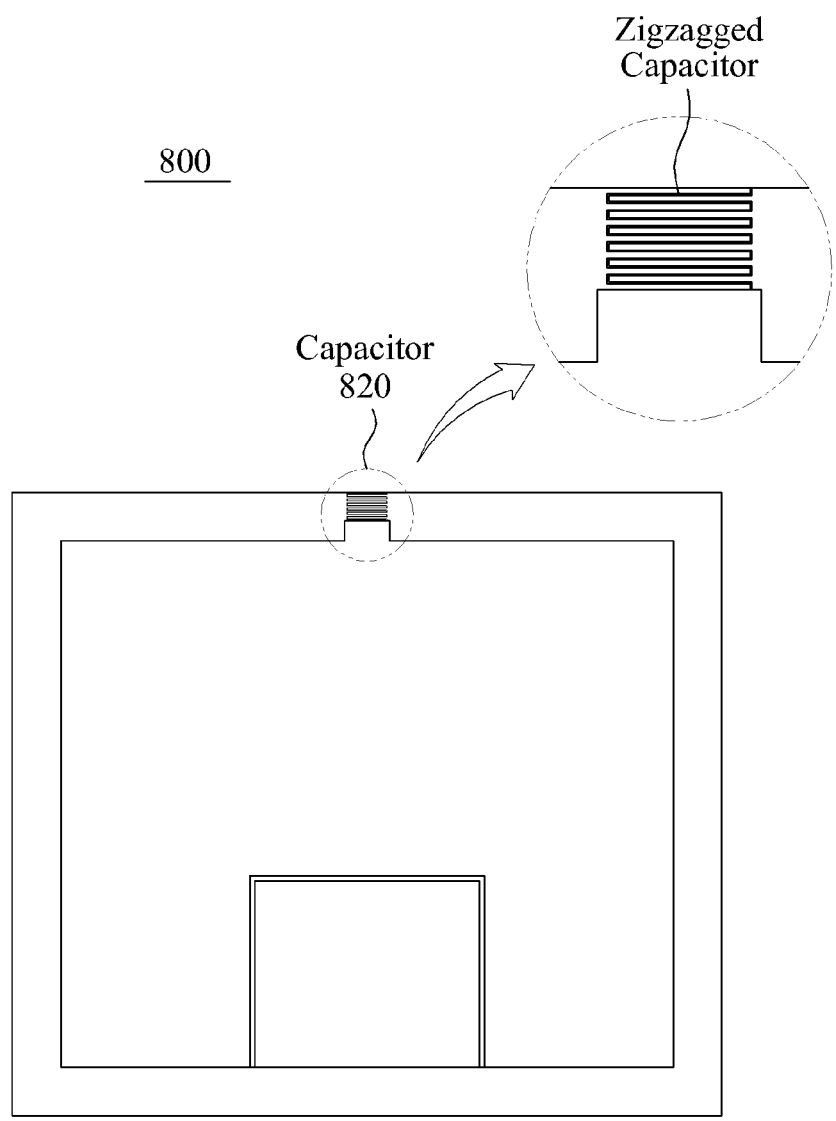

FIG. 8 illustrates an example of a resonator 800 for wireless power transmission that includes a distributed capacitor 820. A capacitor as a lumped element may have a relatively high equivalent series resistance (ESR). An ohmic loss caused by the ESR may decrease a Q-factor and a coupling effect of a resonator. A variety of schemes have been proposed to decrease the ESR included in the capacitor of the lumped element. According to an example, by using the capacitor 820 as a distributed element, a decrease in the ESR is possible.

In more detail, the capacitor 820 has a zigzagged structure. For example, the capacitor 820 as the distributed element is configured as a conductive line and a conductor having the zigzagged structure. Employing the capacitor 820 as the distributed element causes a decrease in the loss occurring due to the ESR.

In addition, by disposing a plurality of capacitors as lumped elements, a decrease in the loss occurring due to the ESR may be possible. Because a resistance of each of the capacitors as the lumped elements decreases through a parallel connection, active resistances of parallel-connected capacitors as the lumped elements may also decrease. Thus, the loss occurring due to the ESR may decrease. For example, employing ten capacitors of 1 picofarads (pF) instead of using a single capacitor of 10 pF, may decrease the loss occurring due to the ESR.

Figure 9:
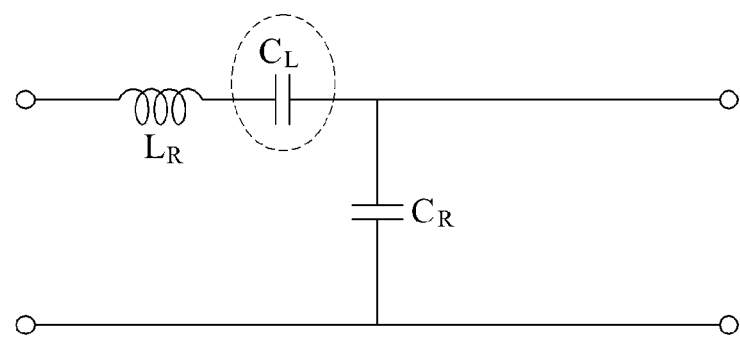
FIG. 9 is a diagram illustrating an example of an equivalent circuit of a resonator of FIG. 3.

FIG. 9 illustrates an example of an equivalent circuit of the resonator for wireless power transmission of FIG. 3. The resonator of FIG. 3 may be modeled to the equivalent circuit of FIG. 9. In the equivalent circuit of FIG. 9, $C_L$ corresponds to a capacitor that is inserted in the form of a lumped element at approximately the middle of one of the transmission lines of FIG. 3.

In this example, the resonator of FIG. 3 may have a zeroth resonance characteristic. For example, in response to a propagation constant being "0", the resonator of FIG. 3 may have $\omega_{MZR}$ as a resonance frequency. The resonance frequency $\omega_{MZR}$ is expressed by Equation 1.

$$\omega_{MZR} = \frac{1}{\sqrt{L_R C_L}}$$ [Equation 1]

In Equation 1, MZR corresponds to a Mu zero resonator. The capacitance $C_R$ of the resonator is negligible compared to the capacitance $C_L$ of the lumped element capacitor, so it is omitted from Equation 2. The resonance frequency $\omega_{MZR}$ of the resonator of FIG. 3 depends on $L_R C_L$. A physical size of the resonator of FIG. 3 and the resonance frequency $\omega_{MZR}$ may be independent of each other. Because the physical size and the resonance frequency are independent with respect to each other, the physical size of the resonator of FIG. 3 may be sufficiently reduced.

Figure 10:
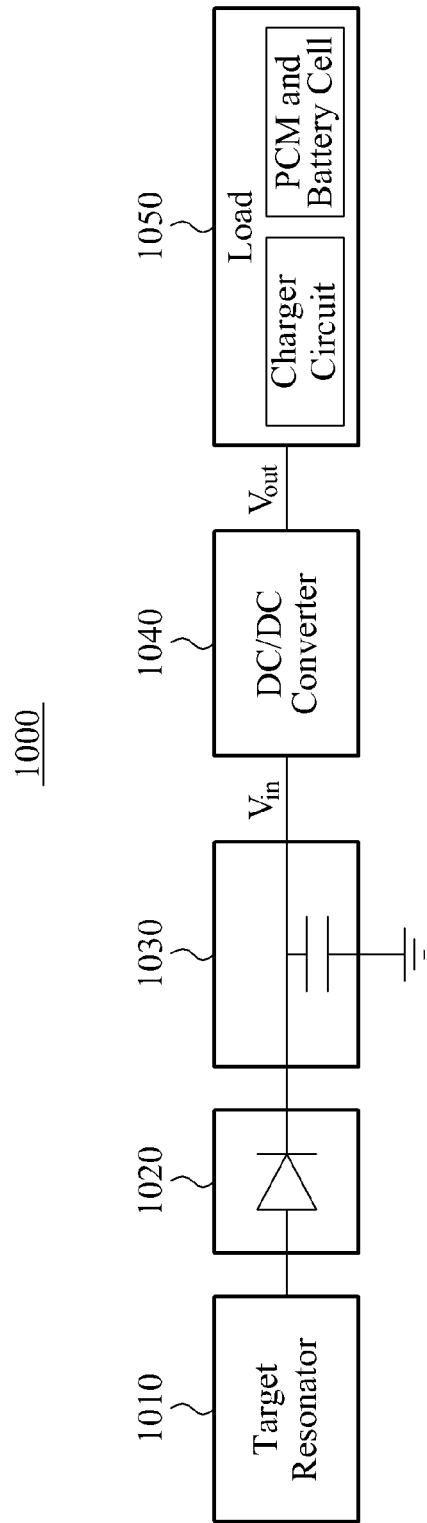
FIG. 10 is a diagram illustrating an example of a rectification system of a wireless power receiver.

FIG. 10 illustrates an example of a rectification system 1000 of a wireless power receiver. The rectification system 1000 includes a target resonator 1010, a rectifier 1020, a capacitor 1030, and a DC/DC converter 1040.

The target resonator 1010 receives a radio frequency (RF) power. The rectifier 1020 rectifies the received RF power. The rectifier 1020 may include, for example, a rectifier diode and/or the like.

The capacitor 1030 stores the power rectified by the rectifier 1020. That is, the rectifier 1020 and the capacitor 1030 convert the received RF power to a DC power.

The converted DC power is input into the DC/DC converter 1040. An input voltage ($V_{in}$) refers to a level of the converted DC power that is input into the DC/DC converter 1040.

The DC/DC converter 1040 converts the input voltage $V_{in}$ to an output voltage ($V_{out}$). A voltage level of the output voltage $V_{out}$ may correspond to +5 volts (V). Here, +5V is provided as an example, and may refer to a level of a voltage requested by a load 1050.

The DC/DC converter 1040 supplies a power corresponding to a voltage level of the converted DC power to the load 1050. The load 1050 may correspond to a battery. The load 1050 includes a charger circuit, a protection circuit module (PCM), and a battery cell.

A high voltage may be applied to the rectifier 1020 and/or the capacitor 1030 of the rectification system 1000. In addition, the wireless power transmission may employ a resonance scheme using a band of 1 MHz to 15 MHz.

In order to design the rectifier 1020 with a high efficiency in the band of 1 MHz to 15 MHz, the rectifier 1020 may include a Schottky diode. The Schottky diode may have characteristics of a low voltage drop and a fast recovery time. Performance of the Schottky diode may be constrained by a size of the Schottky diode. Consequently, a constraint on an available voltage and current may occur due to the size constraint. For example, when the Schottky diode is used for an application for a mobile device, the Schottky diode may have a size applicable to the mobile device, and a general-purpose Schottky diode having an allowable current of 1 ampere (A) and a voltage drop less than or equal to 0.5 V may have a peak reverse voltage between 20 V and 30 V. As used herein, the term "peak reverse voltage" may be interchangeable with a term "peak-inverse-voltage".

A peak reverse voltage may refer to a maximum voltage that may be applied to a device in a reverse direction. When a voltage applied to the Schottky diode exceeds the peak reverse voltage, the Schottky diode may be damaged. Accordingly, there is a demand for a protection circuit that may protect the Schottky diode so that voltages applied to an input end and an output end of the rectifier 1020 may not exceed the peak reverse voltage of the Schottky diode.

Figure 11:
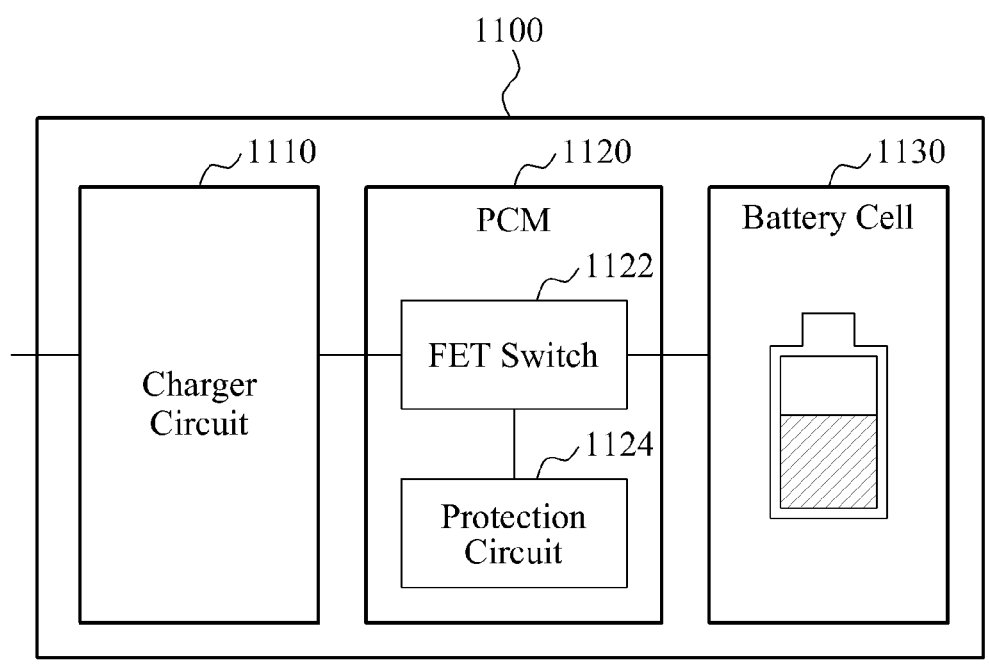
FIG. 11 is a diagram illustrating an example of a battery.

FIG. 11 illustrates an example of a battery 1100. The battery 1100 may correspond to the load 1050 of FIG. 10. The battery 1100 includes a charger circuit 1110, a PCM 1120, and a battery cell 1130.

The charging circuit 1110 adjusts a level of a charging voltage and a level of a charging current based on a charging stage of the battery 1100, for a stable charging operation of the battery 1100. The battery 1100 has a configuration in which a power is transferred to the charger circuit 1110, and then transferred to the PCM 1120 and the battery cell 1130.

The PCM 1120 protects the battery 1100 from an overvoltage, an over-discharge, an overcurrent, and/or the like. The battery cell 1130 charges a current.

In more detail, the PCM includes a field-effect transistor (FET) switch 1122 and a protection circuit 1124. The FET switch 1122 includes a switch between a power provided from an external environment and the battery cell 1130. When the FET switch 1122 is closed, the power provided from the external environment is transferred to the battery cell 1130, and the battery 1100 is charged.

The protection circuit 1124 senses a voltage, a current, and/or the like, applied to the battery 1100. When an overvoltage, an over-discharge, an overcurrent, and/or the like is detected, the protection circuit 1124 blocks the FET switch 1122 from transferring power to the battery cell 1130, thereby enabling the battery 1100 to be in an open state to protect the battery cell 1130.

Figure 12:
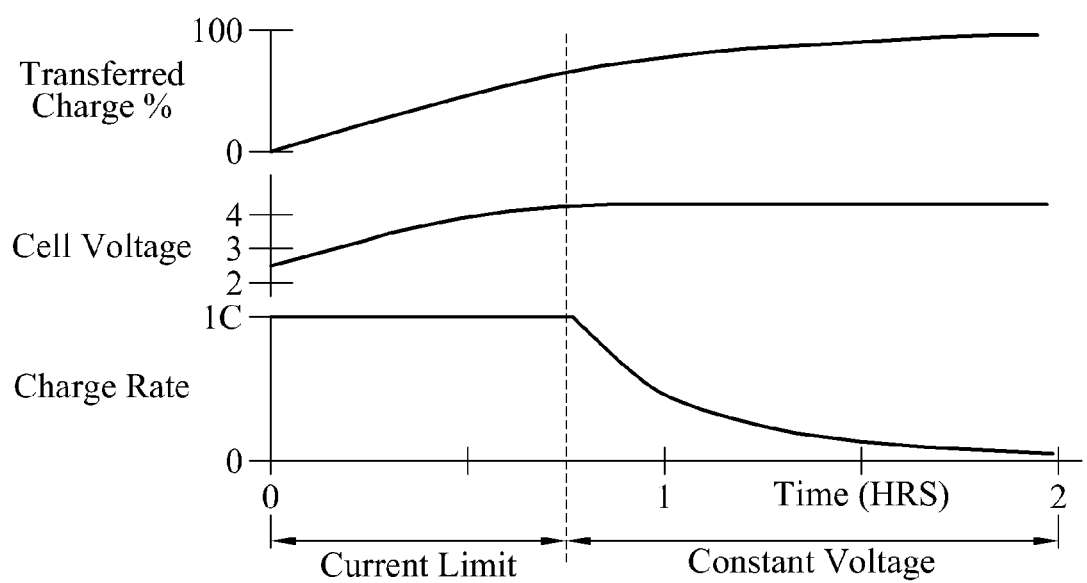
FIG. 12 is a graph illustrating an example of a charging of a battery according to a charging time.

FIG. 12 illustrates an example of a charging graph of a battery according to a charging time. The battery 1100 of FIG. 11 may correspond to a battery of a mobile device. The graph of FIG. 12 may correspond to a charging graph of a battery for a mobile device.

For example, a constant current of about 600 milli amperes (mA) flows from an initial state in which the battery 1100 of FIG. 11 is initiated to be charged, to a state in which the battery 1100 is charged up to about 80% of capacity. That is, a period from the initial state in which the battery 1100 is initiated to be charged, to the state in which the battery 1100 is charged up to about 80% of capacity, may be regarded as a current limit period. In this example, an output voltage corresponding to a cell voltage of the battery cell 1130 is increased from 2.5 V to 4.2 V.

After the battery 1100 is charged up to about 80% of capacity, the output voltage of the battery cell 1130 is a constant voltage of 4.2 V, and an amount of a current used to charge the battery 1100 (e.g., a charge rate), is gradually reduced. A period after the battery 1100 is charged up to about 80% of capacity, may be regarded as a constant voltage period.

When the battery 1100 is fully charged, that is, in a full charging state, the PCM 1120 or the FET switch 1122 of FIG. 11 is disconnected from a power supply, and the battery 1100 is in an open state. That is, a voltage of the battery 1100 is constant, and the amount of the current used to charge the battery 1100 is reduced during a period from when the charging state of the battery 1100 corresponds to about 80% of capacity, to when the charging state of the battery 1100 is close to 100% of capacity, that is, a full charging state. Accordingly, an impedance of a load (e.g., the battery 1100) is gradually increased from 10 ohms (Ω) to 20 Ω, 50Ω, and 100Ω, based on Equation 2.

$$Z_{load} = V_{load} / I_{load},$$ [Equation 2]

where $Z_{load}$ denotes the impedance of the load, $V_{load}$ denotes a voltage of the load, and $I_{load}$ denotes a current of the load.

When the PCM 1120 of the battery 1100 is operated, the impedance of the load corresponds to an open load, that is, a few kilo-ohms (kΩ).

Figure 13:
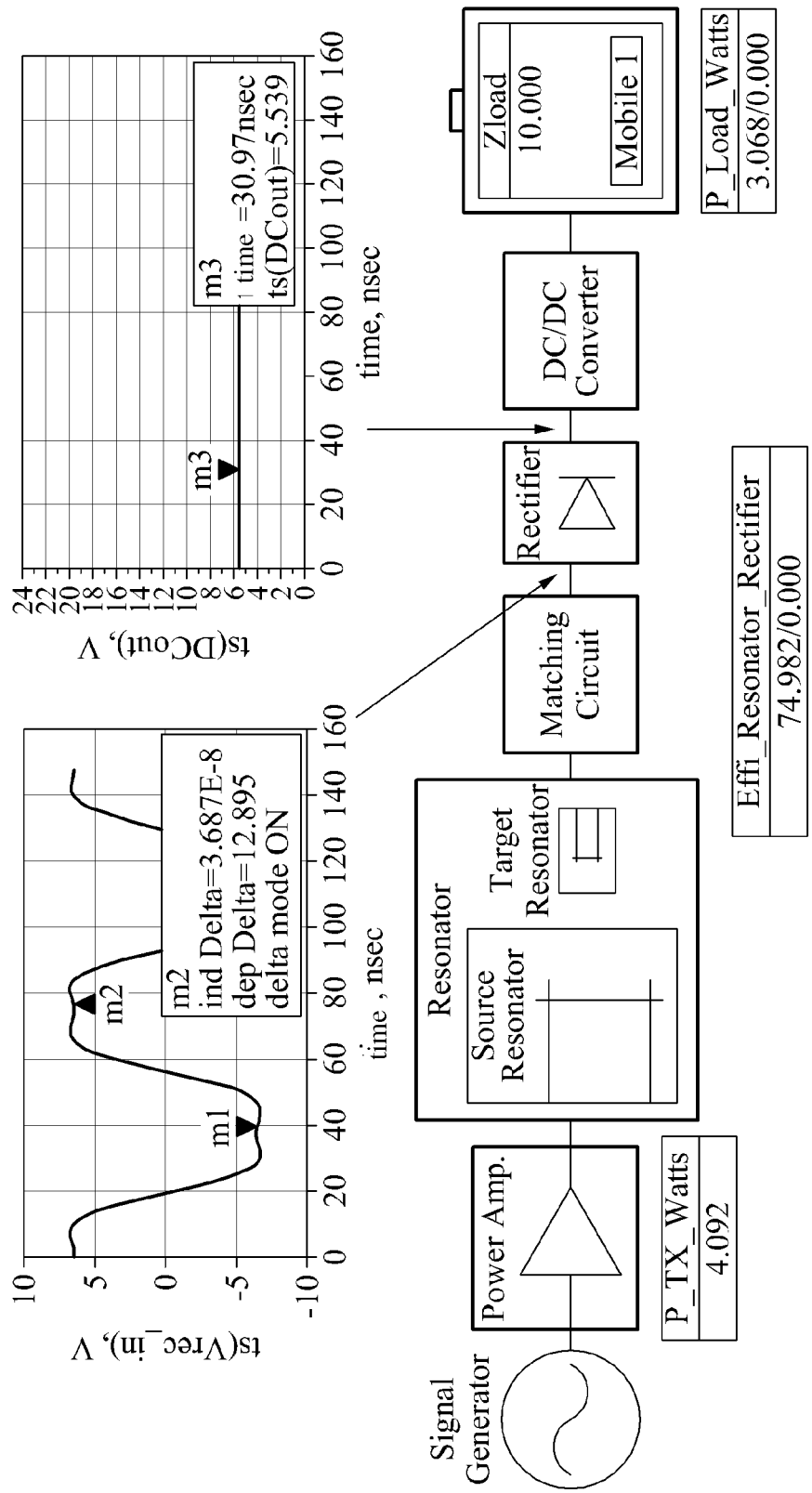
FIG. 13 is a diagram illustrating an example of results of a simulation of magnitudes of voltages applied, respectively, to a front end and a back end of a rectifier when a load impedance corresponds to 10 ohms ($\Omega$).
Figure 14:
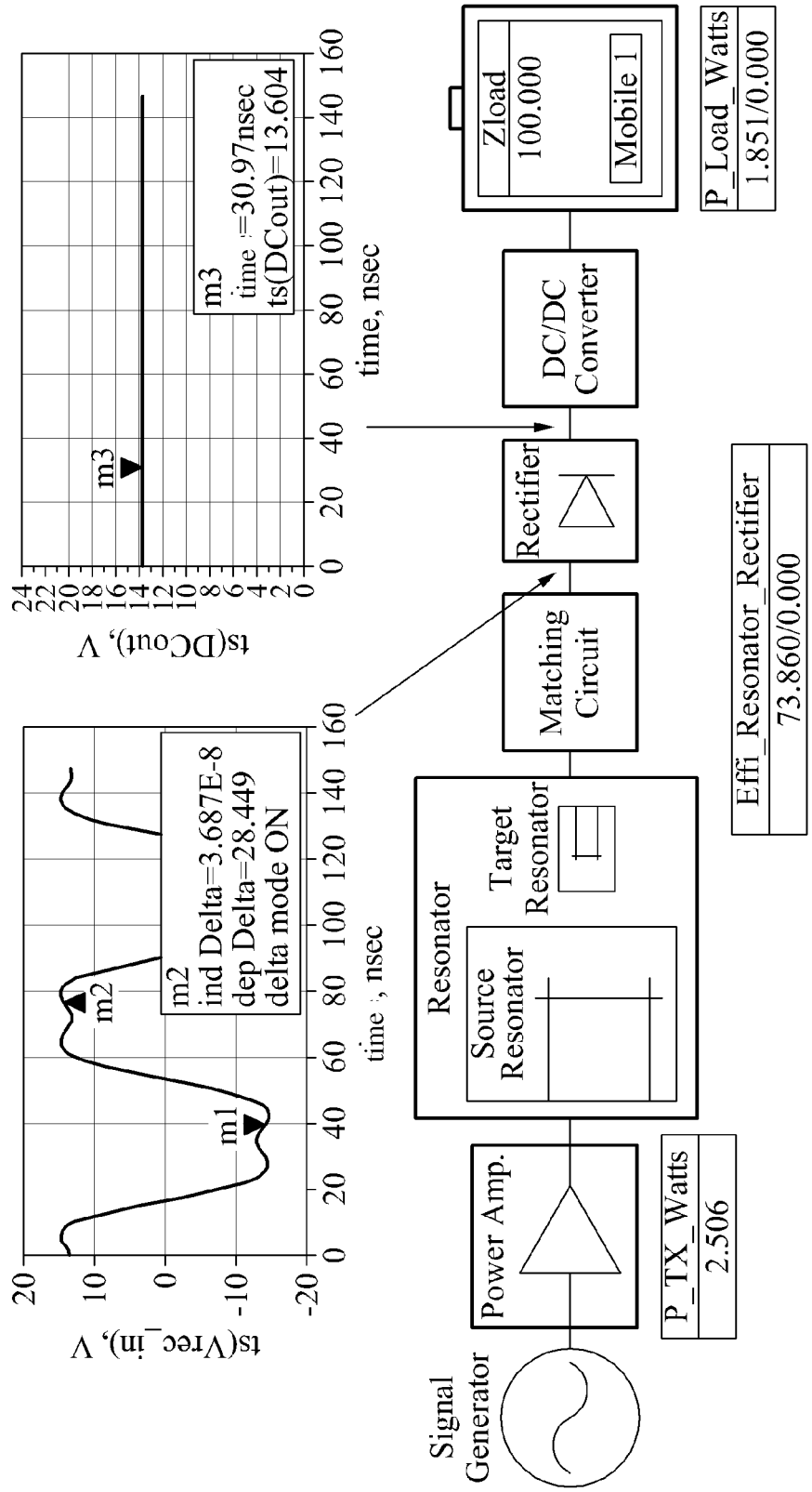
FIG. 14 is a diagram illustrating an example of results of a simulation of magnitudes of voltages applied, respectively, to a front end and a back end of a rectifier when a load impedance corresponds to 100$\Omega$.
Figure 15:
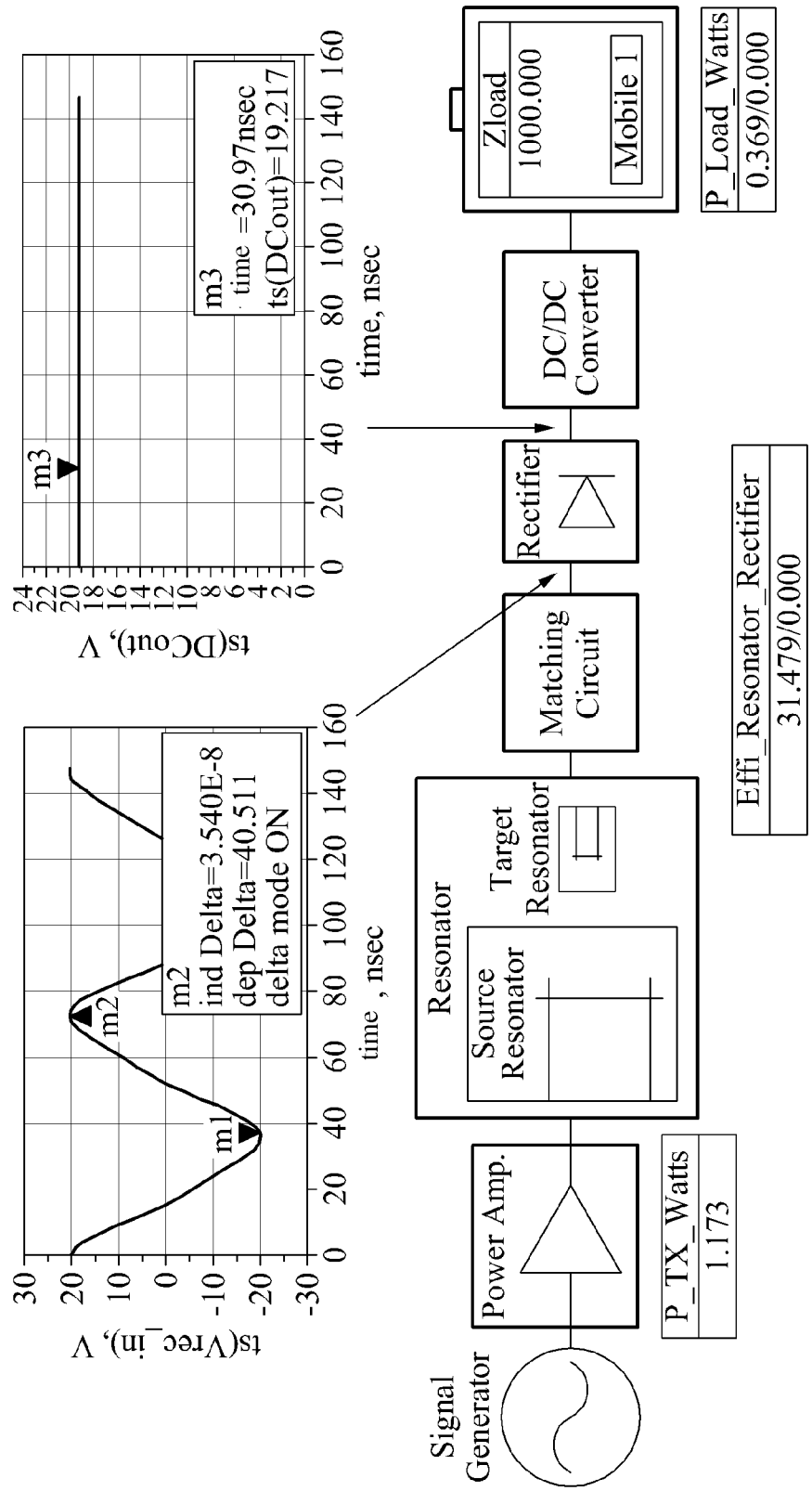
FIG. 15 is a diagram illustrating an example of results of a simulation of magnitudes of voltages applied, respectively, to a front end and a back end of a rectifier when a load impedance corresponds to 1 kilo-ohm (k$\Omega$).

FIGS. 13 through 15 illustrate examples of results of simulations of magnitudes of voltages applied, respectively, to a front end (e.g., an input end) and a back end (e.g., an output end) of a rectifier, using an Advanced Design System (ADS) tool, when an impedance of a load is changed from 10Ω to 100Ω to 1 kΩ. With reference to FIGS. 13 through 15, a change in a voltage level based on an impedance when a battery load for a mobile device is charged, will be described. Each block shown in FIGS. 13 through 15 may be modeled to correspond to a device that may be used in reality.

FIG. 13 illustrates an example of results of a simulation of magnitudes of voltages applied, respectively, to a front end and a back end of a rectifier when an impedance of a load corresponds to 10Ω. In more detail, FIG. 13 shows simulation results when an impedance $Z_{load}$ of a load corresponds to 10Ω, that is, with respect to a period during which the battery 1100 of FIG. 11 is normally charged.

For example, a power output from a power amplifier (PA) is 4.6 W. However, due to improper matching of output impedances, a power output to a source resonator (e.g., P_TX_Watts) is reduced to 4.09 W.

When an efficiency in a case in which a power passes through a target resonator, a matching circuit, and the rectifier (e.g., Effi_Resonator_Rectifier), is about 74.98%, and a power (e.g., P_Load_Watts) of about 3 W is transferred to the load. A peak-to-peak voltage of 12.895 V is applied to the front end of the rectifier, and a DC voltage of 5.539 V is applied to the back end of the rectifier.

Accordingly, in a normal charging period, a power is transferred efficiently without burdening the rectifier. The normal charging period may correspond to a constant current mode in which a constant current flows through the load.

FIG. 14 illustrates an example of results of a simulation of magnitudes of voltages applied, respectively, to a front end and a back end of a rectifier when an impedance of a load corresponds to 100Ω. In more detail, FIG. 14 shows simulation results when an impedance $Z_{load}$ of a load corresponds to 100Ω, that is, with respect to a period during which a charging state of the battery 1100 of FIG. 11 is getting closer to a full charging state. The period during which the charging state of the battery 1100 is getting closer to the full charging state may correspond to a constant voltage mode in which a constant voltage is applied to the load.

For example, a power output from a PA is 4.6 W. However, due to improper matching of output impedances, a power output to a source resonator is reduced to 2.5 W.

An efficiency in a case in which a power passes through a target resonator, a matching circuit, and the rectifier, is about 73.86%. A power of 1.851 W is transferred to the load. Since the impedance of the load is relatively large in value, a peak-to-peak voltage of 28.449 V is applied to the front end of the rectifier, and a DC voltage of 13.6 V is applied to the back end of the rectifier, when a relatively low amount of power is transferred to the load. That is, the voltage applied to the front end of the rectifier becomes close to a peak reverse voltage of a Schottky diode, e.g., 30 V.

FIG. 15 illustrates an example of results of a simulation of magnitudes of voltages applied, respectively, to a front end and a back end of a rectifier when an impedance of a load corresponds to 1 kΩ. In more detail, FIG. 15 illustrates simulation results when an impedance $Z_{load}$ of a load corresponds to 1 kΩ, that is, with respect to a period during which the battery 1100 of FIG. 11 is fully charged.

For example, a power output from a PA is 4.6 W. However, due to improper matching of output impedances, a power output to a source resonator is reduced to 1.173 W.

An efficiency in a case in which a power passes through a target resonator, a matching circuit, and the rectifier is about 31.48%. A power of 0.369 W is transferred to the load. Since the impedance of the load is relatively great, a peak-to-peak voltage of 40.5 V is applied to the front end of the rectifier, and a DC voltage of 19.2 V is applied to the back end of the rectifier, when a relatively less power is transferred to the load. When the aforementioned voltages are applied to the front end and the back end of the rectifier, and a Schottky diode used in the rectifier has a peak reverse voltage of 30 V, the Schottky diode may be damaged.

Output impedance matching of the PA, which may be set to 50Ω, may more match an impedance $Z_{load}$ in an actual experimental environment. When the output impedance matching of the PA more matches the impedance $Z_{load}$, a magnitude of a power to be transferred to a resonator may increase. Accordingly, voltages greater than the voltages shown in the simulation results, may be applied to both ends of the rectifier.

In an application of an electric vehicle that may transmit a wireless power of a few kW, a change in a voltage applied to the rectifier, when the impedance $Z_{load}$ is changed depending on a charging state of the load, may be similar to the descriptions provided with reference to FIGS. 13 through 15. In addition, a voltage level in the application of the electric vehicle may be much greater than a voltage level in an application for a mobile device. Accordingly, in order to charge a load (e.g., a battery) wirelessly and efficiently, there is a demand for a circuit that may protect a rectifier or a power receiver.

As can be understood from FIGS. 13 through 15, when a resonance-type wireless power transmission is used, a level of an input voltage of a DC/DC converter may be determined based on a state of an impedance of a load. Accordingly, as a charging state of the load approaches a full charging state, the impedance of the load may increase, and the rectifier and/or the like of the wireless power receiver may be damaged due to an overvoltage caused by the increased impedance of the load.

Figure 16:
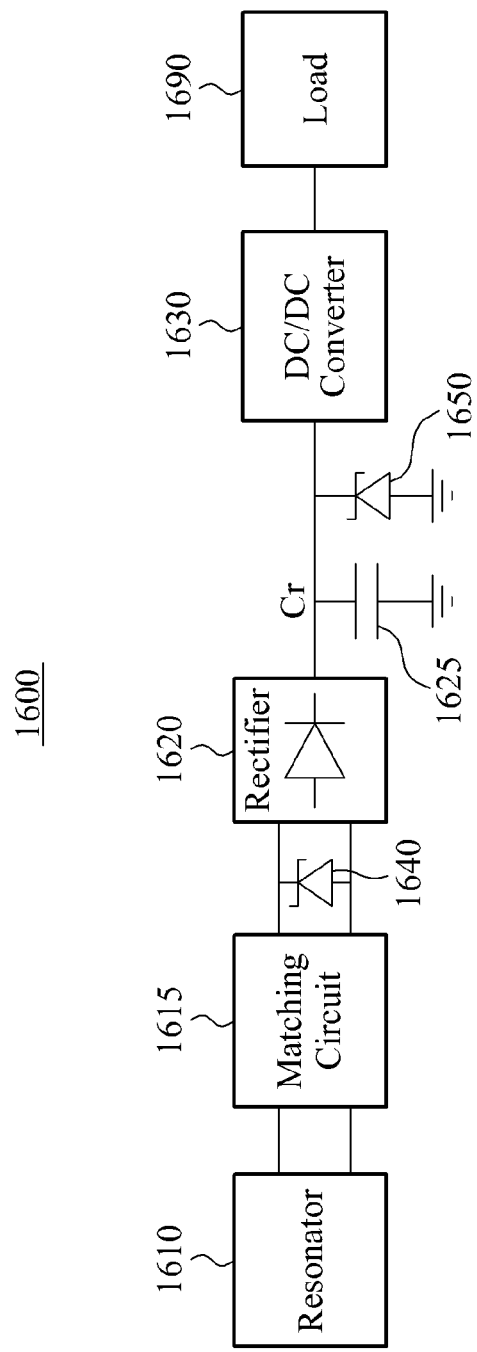
FIG. 16 is a diagram illustrating an example of a wireless power receiver including a short-type protection circuit.

FIG. 16 illustrates an example of a wireless power receiver 1600 including a short-type protection circuit. The wireless power receiver 1600 may correspond to a wireless power receiver for a mobile application having a band of a few MHz. The wireless power receiver 1600 includes a resonator 1610, a matching circuit 1615, a rectifier 1620, a capacitor 1625, and a DC/DC converter 1630. The wireless power receiver 1600 further includes a load 1690.

The resonator 1610 may correspond to the target resonator 1010 of FIG. 10. The resonator 1610 provides a received power to the rectifier 1620 through the matching circuit 1615.

The matching circuit 1615 may include an impedance matching circuit. The rectifier 1620 may correspond to the rectifier 1020 of FIG. 10. The capacitor 1625 may correspond to the capacitor 1030 of FIG. 10. The DC/DC converter 1630 may correspond to the DC/DC converter 1040 of FIG. 10. The load 1690 may correspond to the load 1050 of FIG. 10.

The wireless power receiver 1600 further includes a first varistor 1640 and a second varistor 1650. Here, the first varistor 1640 and the second varistor 1650 are provided as examples. Each of the first varistor 1640 and the second varistor 1650 may be replaced with a predetermined device that may create a short circuit when a voltage greater than a threshold voltage is applied.

The rectifier 1620 outputs a rectified signal through an output end by rectifying a signal received by the resonator 1610. The capacitor 1625 is connected to the output end of the rectifier 1620 and ground.

The DC/DC converter 1630 is connected to the output end of the rectifier 1620 and the load 1690. The DC/DC converter 1630 converts the rectified signal, and provides a converted power to the load 1690. The DC/DC converter 1630 may include a DC/DC buck converter.

The first varistor 1640 and the second varistor 1650 create a short circuit when a voltage greater than the threshold voltage is applied. For example, the first varistor 1640 create a short circuit when a voltage greater than a first threshold voltage is applied to an input end of the rectifier 1620. The second varistor 1650 create a short circuit when a voltage greater than a second threshold voltage is applied to the output end of the rectifier 1620.

For example, in the mobile application using the band of a few MHz, the wireless power receiver 1600 protects the rectifier 1620 and/or the capacitor 1625, using the first varistor 1640 and the second varistor 1650. In this example, when the first varistor 1640 creates a short circuit before a voltage greater than a peak voltage of the rectifier 1620 is applied to the rectifier 1620, a voltage applied to the rectifier 1620 is reduced, and an impedance of the rectifier 1620 is changed, whereby a power received by the rectifier 1620 is reduced. That is, when the first varistor 1640 creates a short circuit, the rectifier 1620, or a Schottky diode included in the rectifier 1620, is protected. The first varistor 1640 may include a varistor for RF.

Also, when the second varistor 1650 creates a short circuit before a voltage greater than a peak voltage of the capacitor 1625 is applied to the capacitor 1625, a voltage applied to the capacitor 1625 is reduced, and an impedance of the capacitor 1625 is changed, whereby a power received by the capacitor 1625 is reduced. That is, when the second varistor 1650 creates a short circuit, the capacitor 1625 is protected. The second varistor 1650 may include a varistor for DC.

An input signal that is input through both input ends of the rectifier 1620 may correspond to a differential signal. Accordingly, the first varistor 1640 is connected in parallel to both of the input ends of the rectifier 1620.

The first varistor 1640 should not influence the matching circuit 1615. Accordingly, the first varistor 1640 may include a device having a relatively low capacitance. For example, in a mobile application using a frequency of 13.56 MHz for wireless power transmission, the capacitance of the first varistor 1640 may be less than or equal to 50 pF.

For example, a voltage of about 3 V to about 5 V less than a peak reverse voltage of the Schottky diode included in the rectifier 1620, may be used as a breakdown voltage of the first varistor 1640. In this example, when the peak reverse voltage of the Schottky diode is 30 V, the breakdown voltage of the first varistor 1640 may be 27 V. That is, the first varistor 1640 may include a device having a breakdown voltage of about 27 V.

In order to protect the capacitor 1625, the second varistor 1650 is connected to the capacitor 1625 in parallel. That is, the second varistor 1650 is connected to the capacitor 1625 and ground.

The second varistor 1650 may be used in a DC area. Accordingly, a capacitance of the second varistor 1650 may vary. A breakdown voltage of the second varistor 1650 may be, for example, 18 V. That is, the second varistor 1650 may include a device having a breakdown voltage of about 18 V.

Figure 17:
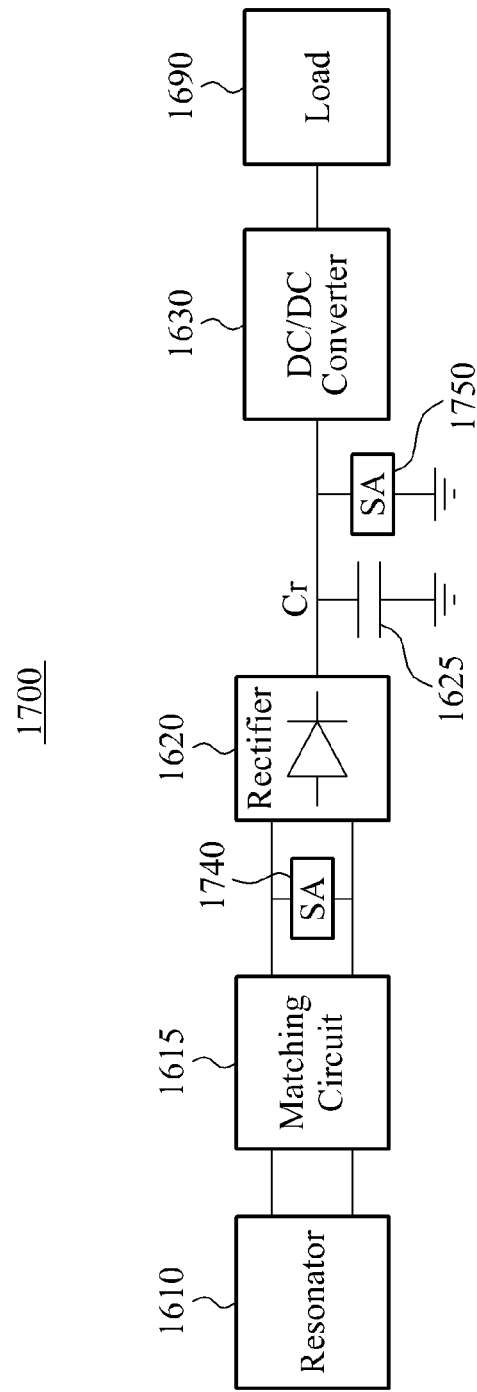
FIG. 17 is a diagram illustrating another example of a wireless power receiver including a short-type protection circuit.

FIG. 17 illustrates another example of a wireless power receiver 1700 including a short-type protection circuit. The wireless power receiver 1700 may correspond to a wireless power receiver for a mobile vehicle application using a band of a few kHz. The wireless power receiver 1700 includes the resonator 1610, the matching circuit 1615, the rectifier 1620, the capacitor 1625, and the DC/DC converter 1630. The wireless power receiver 1700 further includes the load 1690.

The wireless power receiver 1700 further includes a first surge absorber (SA) 1740 and a second SA 1750, in lieu of the first varistor 1640 and the second varistor 1650 of the wireless power receiver 1600 of FIG. 16. The descriptions of the first varistor 1640 and the second varistor 1650, provided with reference to FIG. 16, may be applied to the first SA 1740 and the second SA 1750, respectively. Here, the first SA 1740 and the second SA 1750 may be operated at a voltage greater than or equal to hundreds of volts (V), as devices that create a short circuit when a voltage greater than a threshold voltage is applied, in order to protect a Schottky diode of the rectifier 1620. The first SA 1740 may include an SA for RF, and the second SA 1750 may include an SA for DC.

For example, an operating frequency of a wireless power receiver for an electric vehicle application may be relatively low. Accordingly, the wireless power receiver 1700 may include devices having identical capacitances as devices for RF and DC, without distinguishing between a device for RF and a device for DC. A value of an operating voltage of the device for RF may be, for example, twice greater than a value of an operating voltage of the device for DC.

The aforementioned short-type protection circuit protects the rectifier 1620, and the Schottky diode included in the rectifier 1620, from a surge voltage, for example, an electrostatic discharge (ESD) and/or the like, which may occur in, for example, a transient period of an initial state and/or the like. However, although the short-type protection circuit is used, a protective device may be damaged in a full charging state, or in a state in which a high impedance may be maintained constantly, for example, in a constant voltage mode. In order to prevent such damage, an open-type protection circuit, which will be described later, may be used in conjunction with the short-type protection circuit.

Figure 18:
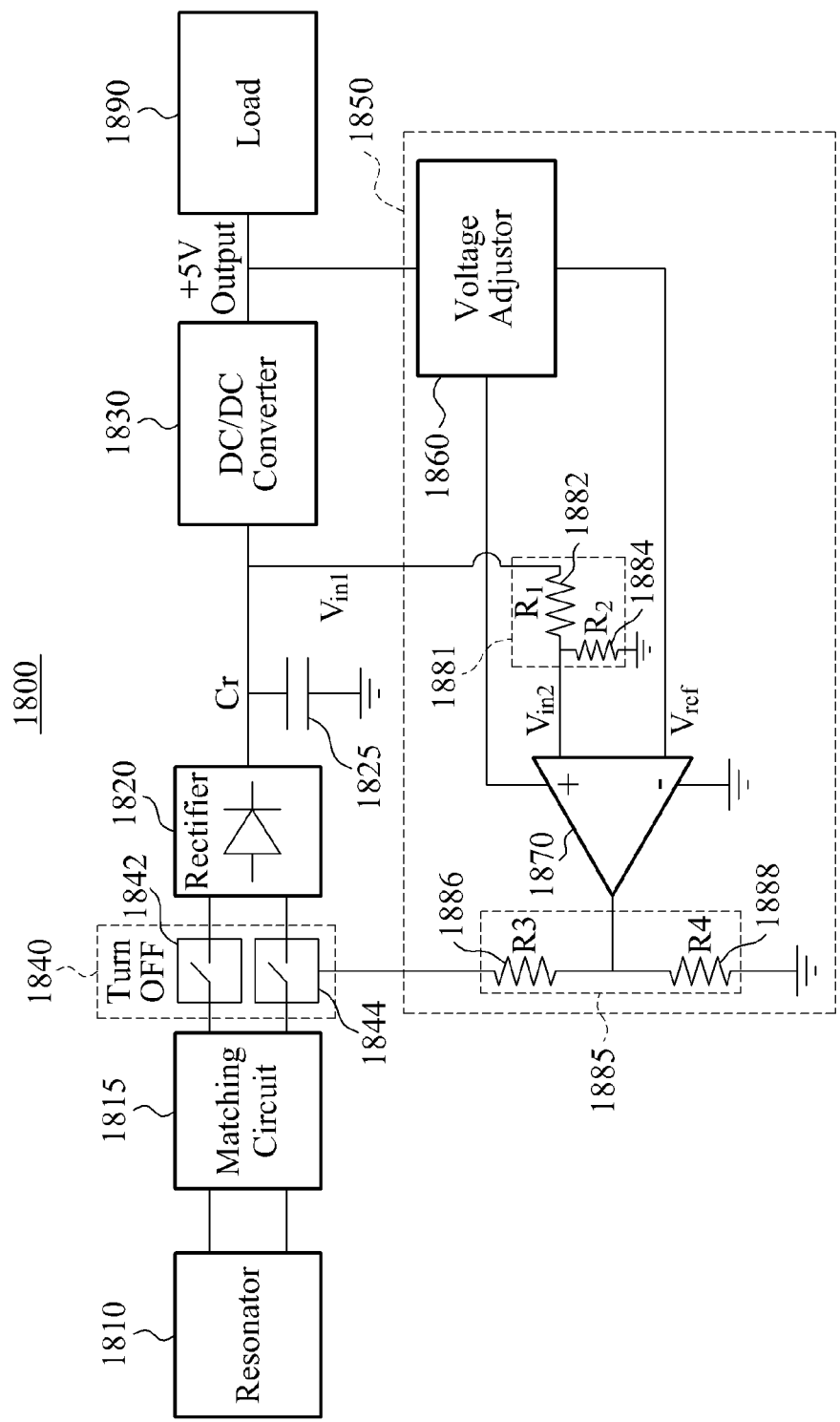
FIG. 18 is a diagram illustrating an example of a wireless power receiver including an open-type protection circuit.

FIG. 18 illustrates an example of a wireless power receiver 1800 including an open-type protection circuit. The wireless power receiver 1800 includes a resonator 1810, a matching circuit 1815, a rectifier 1820, a capacitor 1825, a DC/DC converter 1830, a switch unit 1840, and a protection unit 1850. The wireless power receiver 1800 further includes a load 1890.

The resonator 1810 may correspond to the target resonator 1010 of FIG. 10. The resonator 1810 provides a received power to the rectifier 1820 through the matching circuit 1815.

The matching circuit 1815 may include, for example, an impedance matching circuit. The rectifier 1820 may correspond to the rectifier 1020 of FIG. 10. The capacitor 1825 may correspond to the capacitor 1030 of FIG. 10. The DC/DC converter 1830 may correspond to the DC/DC converter 1040 of FIG. 10. The DC/DC converter 1830 may include, for example, a buck converter. The load 1890 may correspond to the load 1050 of FIG. 10.

The rectifier 1820 outputs a rectified signal through an output end by rectifying a signal received by the resonator 1810. The capacitor 1825 is connected to the output end of the rectifier 1820 and ground.

The DC/DC converter 1830 is connected to the output end of the rectifier 1820 and the load 1890. The DC/DC converter 1830 converts the rectified signal, and provides a converted power to the load 1890.

The switch unit 1840 includes two switches, that is, a first switch 1842 and a second switch 1844. Each of the first switch 1842 and the second switch 1844 may include, for example, a RF switch.

Each of the first switch 1842 and the second switch 1844 connect one of both respective input ends of the rectifier 1820 to the resonator 1810. For example, the first switch 1842 connects a first input end of the rectifier 1820 to the resonator 1810. The second switch 1844 connects a second input end of the rectifier 1820 to the resonator 1810.

Each of the first switch 1842 and the second switch 1844 includes a switch of which an initial condition is to create a short circuit. As an example, each of the first switch 1842 and the second switch 1844 may include a p-channel metal-oxide-semiconductor field-effect transistor (PMOS) switch. That is, each of the first switch 1842 and the second switch 1844 may include an analog switch having a relatively low insertion loss, and of which an initial condition is to create a short circuit. As another example, each of the first switch 1842 and the second switch 1844 may include an RF PMOS FET. That is, each of the first switch 1842 and the second switch 1844 may be turned ON, or create a short circuit, when a control voltage of 0 V is received or applied, and may be turned OFF, or opened, when a control voltage of 3.3 V is received or applied. The voltage values described above are merely examples, and other voltage values may be used depending on the situation.

The protection unit 1850 controls the switch unit 1840. In more detail, the protection unit 1850 controls the switch unit 1840 to be closed or opened, that is, turned ON or turned OFF, based on a voltage of the rectified signal that is output by the rectifier 1820.

For example, the switch unit 1840 is connected to a front end of the rectifier 1820. When a protection circuit of the protection unit 1850 is operated, the protection unit 1850 opens the first switch 1842 and the second switch 1844 of the switch unit 1840, thereby protecting the rectifier 1820 and the capacitor 1825. The open-type protection circuit protects the wireless power receiver 1800 when the load 1890 is fully charged, or when the wireless power receiver 1800 is in a constant voltage mode.

The protection unit 1850 controls the switch unit 1840, that is, the first switch 1842 and the second switch 1844, to create a short circuit when the voltage of the rectified signal is less than a threshold value, or when the voltage of the rectified signal is less than or equal to the threshold value, thereby enabling the rectifier 1820 to receive an input of the signal received by the resonator 1810. The protection unit 1850 controls the switch unit 1840, that is, the first switch 1842 and the second switch 1844, to be opened when the voltage of the rectified signal is greater than the threshold value, or when the voltage of the rectified signal is greater than or equal to the threshold value, thereby blocking, from the rectifier 1820, the signal received by the resonator 1810.

The protection unit 1850 outputs a switch control signal. The switch unit 1840 creates a short circuit or opened based on the switch control signal.

While the load 1890 is being charged, the protection unit 1850 outputs the switch control signal to control the switch unit 1840 to close. For example, the switch control signal to control the switch unit 1840 to close may include a signal that applies a voltage of 0 V to the switch unit 1840.

When the load 1890 is fully charged, a protection circuit is to be operated. Accordingly, the protection unit 1850 outputs the switch control signal to control the switch unit 1840 to open. For example, the switch control signal to control the switch unit 1840 to open may include a signal that applies a voltage of 3.3 V to the switch unit 1840.

For example, in an initial state in which a control voltage of 0 V is applied to the switch unit 1840 based on the switch control signal, that is, when a voltage of the switch control signal is 0 V, the switch unit 1840 closes the first switch 1842 and the second switch 1844. When the protection circuit is operated, and a control voltage of 3.3 V is applied to the switch unit 1840, that is, when the voltage of the switch control signal is 3.3 V, the switch unit 1840 opens the first switch 1842 and the second switch 1844.

Hereinafter, the protection unit 1850 will be described in detail. The protection unit 1850 includes a voltage adjustor 1860, a comparator 1870, a first voltage divider 1881, and a second voltage divider 1885. The first voltage divider 1881 includes a first resistor 1882 and a second resistor 1884. The second voltage divider 1885 includes a third resistor 1886 and a fourth resistor 1888.

The voltage adjustor 1860 is connected to the DC/DC converter 1830 to receive a converted power that is output by the DC/DC converter 1830. That is, a voltage to be input to the voltage adjustor 1860 is extracted from a back end of the DC/DC converter 1830.

The voltage adjustor 1860 is connected to the comparator 1870 to generate a power source $V_{dd}$ to operate the comparator 1870, and a first comparator input signal $V_{ref}$ of the comparator 1870. The first comparator input signal $V_{ref}$ includes a reference voltage of the comparator 1870. For example, in an application for a mobile device, when a voltage output from the DC/DC converter 1830 is 5 V, the voltage adjustor 1860 may convert the output voltage of 5 V to 3.3 V, which is used for the power source $V_{dd}$ to operate the comparator 1870, and the first comparator input signal $V_{ref}$. That is, the voltage adjustor 1860 generates the first comparator input signal $V_{ref}$ by adjusting the voltage of the converted power that is output by the DC/DC converter 1830. The voltage adjustor 1860 may include, for example, a Low Drop Output (LDO) regulator, a bandgap reference device, and/or the like.

The first voltage divider 1881 is connected to the output end of the rectifier 1820 and the comparator 1870. The first voltage divider 1881 generates a second comparator input signal $V_{in2}$ of the comparator 1870 by dividing a voltage $V_{in1}$ of the rectified signal that is output by the rectifier 1820.

The first resistor 1882 is connected to a positive (+) input end of the comparator 1870 and the output end of the rectifier 1820. The second resistor 1884 is connected to the + input end of the comparator 1870 and ground.

The first resistor 1882 and the second resistor 1884 divide an input voltage, that is, the voltage $V_{in1}$ of the rectified signal that is output by the rectifier 1820, by 1/N, and enable the divided voltage to be output. Here, N corresponds to a real number greater than or equal to 1. For example, when the input voltage is divided by ⅓, a resistance of the first resistor 1882 is 2 kΩ, and a resistance of the second resistor 1884 is 1 kΩ.

By dividing the input voltage, it may be unnecessary to increase the reference voltage $V_{ref}$ using an additional boost converter and/or the like. Also, a single LOD device or a single bandgap reference device may be used for the power $V_{dd}$ to operate the comparator 1870, and the first comparator input signal $V_{ref}$.

The comparator 1870 outputs a comparator output signal through an output end, by comparing the first comparator input signal $V_{ref}$ and the second comparator input signal $V_{in2}$. For example, when the first comparator input signal $V_{ref}$ is higher than the second comparator input signal $V_{in2}$, the comparator 1870 outputs the comparator output signal having a control voltage to control the switch unit 1840 to close, for example, a voltage of 0 V. Conversely, when the second comparator input signal $V_{in2}$ is higher than the first comparator input signal $V_{ref}$, the comparator 1870 outputs the comparator output signal having a control voltage to control the switch unit 1840 to open, for example, the power $V_{dd}$ to operate the comparator 1870, or a voltage of 3.3 V.

The control voltage to control the switch unit 1840 to close may be referred to as a voltage to turn the switch unit 1840 or the wireless power receiver 1800 ON, and the control voltage to control the switch unit 1840 to open may be referred to as a voltage to turn the switch unit 1840 or the wireless power receiver 1800 OFF. The comparator 1870 may perform a hysteresis operation for a stable operation of the wireless power receiver 1800. That is, the comparator 1870 may set a first voltage to change a state of the switch unit 1840 from an open state to a closed state, to be different from a second voltage to change the state of the switch unit 1840 from the closed state to the open state.

As an example, when the second comparator input signal $V_{in2}$ is higher than the first comparator input signal $V_{ref}$ by a voltage greater than 1 V, the comparator 1870 may change the comparator output signal from the control voltage to control the switch unit 1840 to close, to the control voltage to control the switch unit 1840 to open. Conversely, when the second comparator input signal $V_{in2}$ is less than the first comparator input signal $V_{ref}$ by a voltage greater than 1 V, the comparator 1870 may change the comparator output signal from the control voltage to control the switch unit 1840 to open, to the control voltage to control the switch unit 1840 to close.

As another example, when the voltage $V_{in1}$ of the rectified signal, which will be hereinafter referred to as a voltage $V_{in1}$ to be input to the DC/DC converter 1830, is less than or equal to 10 V, the second comparator input signal $V_{in2}$ may be less than or equal to 3.3 V, through a voltage division of 1/N performed by the first voltage divider 1881. Accordingly, since the second comparator input signal $V_{in2}$ is less than the first comparator input signal $V_{ref}$ of 3.3 V, the comparator 1870 may output the comparator output signal having a voltage of 0 V, or the control voltage to control the switch unit 1840 to close. The control voltage to control the switch unit 1840 to close may correspond to a GND.

Conversely, when the voltage $V_{in1}$ to be input to the DC/DC converter 1830 is greater than or equal to 10 V, the second comparator input signal $V_{in2}$ may be greater than or equal to 3.3 V, through the voltage division of 1/N performed by the first voltage divider 1881. Accordingly, since the second comparator input signal $V_{in2}$ is greater than the first comparator input signal $V_{ref}$ of 3.3 V, the comparator 1870 may output the comparator output signal having a voltage of 3.3 V, or the control voltage to control the switch unit 1840 to open.

The second voltage divider 1885 outputs a switch control signal by dividing a voltage of the comparator output signal. The third resistor 1886 is connected to the switch unit 1840 and the output end of the comparator 1870. The third resistor 1886 prevents an overcurrent from flowing through the switch control signal. For example, when the wireless power receiver 1800 is for an application for a mobile device, the third resistor 1886 may have a resistance of 100Ω.

The fourth resistor 1888 is connected to the output end of the comparator 1870 and ground. The fourth resistor 1888 includes a resistor to maintain the two switches receiving the control voltage of 0 V, for example, the first switch 1842 and the second switch 1844, to be turned ON during an initial operation of the wireless power transmission. For example, when the wireless power receiver 1800 is for an application for a mobile device, the fourth resistor 1888 may have a resistance of 10 kΩ. The protection unit 1850 corresponding to an open-type protection unit may resolve a problem of damage to the wireless power receiver 1800 resulting from an operation of a PCM blocking mode when the battery 1100 is fully charged.

Figure 19:
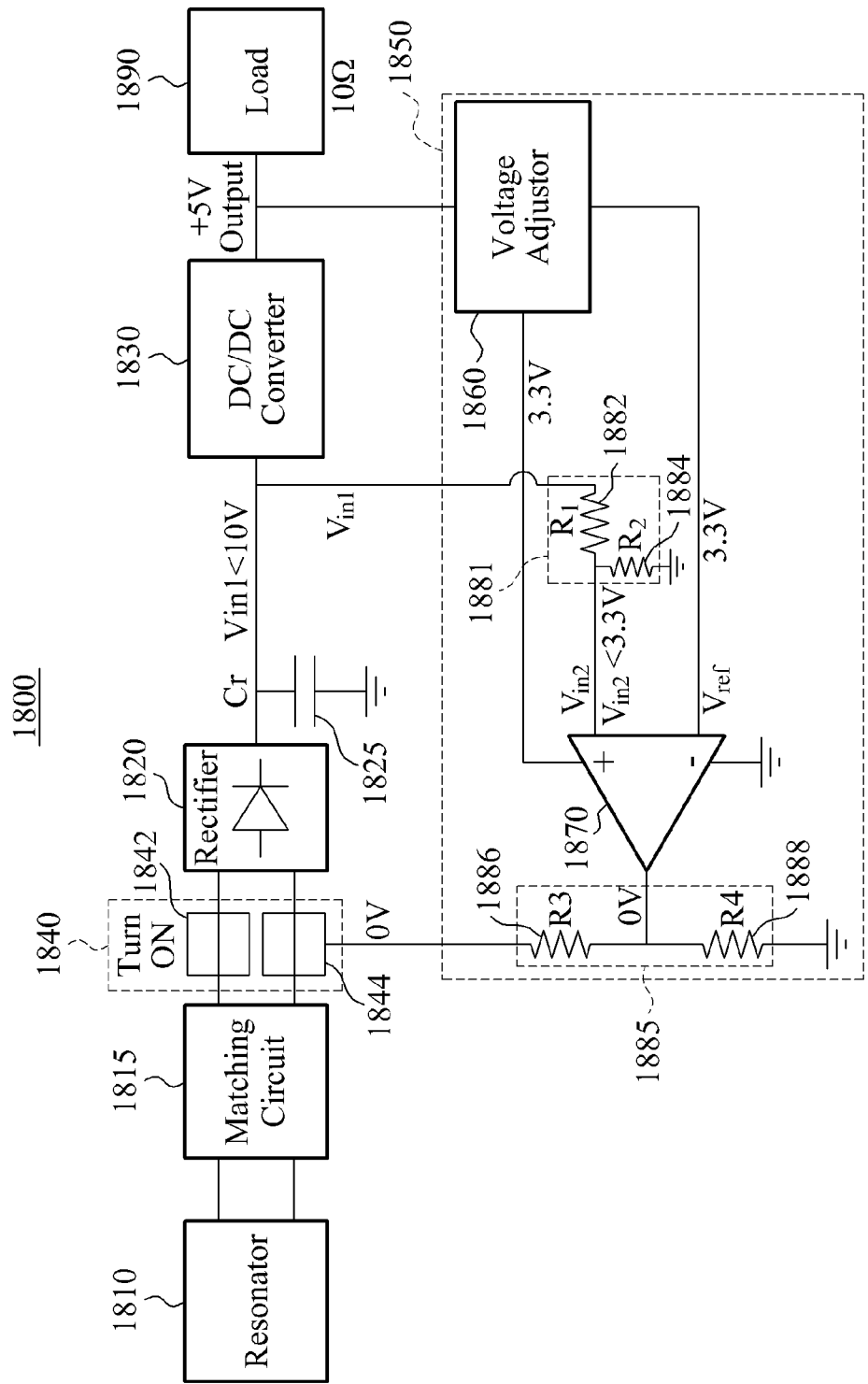
FIG. 19 is a diagram illustrating an example of an operation of a wireless power receiver including an open-type protection circuit in a normal charging mode.

FIG. 19 illustrates an example of an operation of the wireless power receiver 1800 of FIG. 18 including an open-type protection circuit in a normal charging mode. The normal charging mode may refer to a constant current mode.

The switch unit 1840 includes a switch of which an initial condition is to create a short circuit. For example, the switch unit 1840 may include a PMOS switch for each of the first switch 1842 and the second switch 1844.

When the wireless power receiver 1800 receives a wireless power at the beginning, the switch unit 1840 receives, from the protection unit 1850, a comparator output signal having a control voltage $V_c$ of 0 V. Accordingly, the switch unit 1840, that is, the first switch 1842 and the second switch 1844 of the switch unit 1840, may be maintained to be turned ON.

In an application for a mobile device, an impedance of the load 1890 is 10Ω in the normal charging mode. Due to the impedance of the load 1890, a voltage $V_{in1}$ to be input into the DC/DC converter 1830, does not exceed 10 V.

The input voltage $V_{in1}$ is divided 1/N by the first resistor 1882 and the second resistor 1884, and a second comparator input signal $V_{in2}$ is generated, which is less than 3.3 V. A reference voltage of 3.3V is included in a first comparator input signal $V_{ref}$ from the voltage adjustor 1860.

Since the second comparator input signal $V_{in2}$ is less than the first comparator input signal $V_{ref}$, the comparator 1870 outputs a voltage of 0 V corresponding to GND. Accordingly, the switch unit 1840, that is, the first switch 1842 and the second switch 1844 of the switch unit 1840, is maintained to be turned ON.

Figure 20:
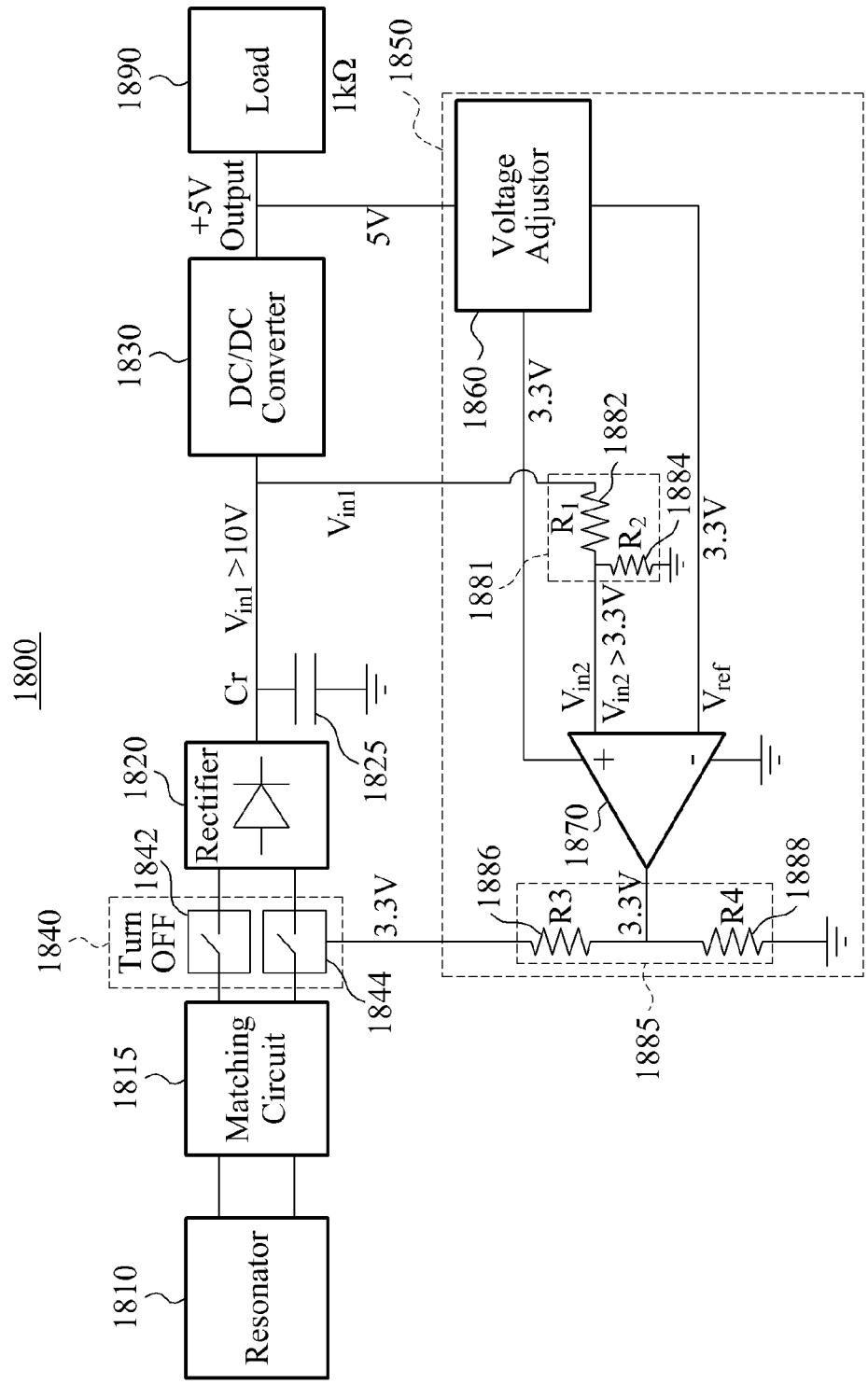
FIG. 20 is a diagram illustrating an example of an operation of a wireless power receiver including an open-type protection circuit in a full charging mode.

FIG. 20 illustrates an example of an operation of the wireless power receiver 1800 of FIG. 18 including an open-type protection circuit in a full charging mode. In an application for a mobile device, an impedance of the load 1890 is considerably increased when a state of the load 1890 is close to a full charging state. For example, when the impedance of the load 1890 is close to 1 kΩ, a voltage $V_{in1}$ to be input into the DC/DC converter 1830 exceeds 10 V.

The input voltage $V_{in1}$ is divided by 1/N by the first resistor 1882 and the second resistor 1884, and a second comparator input signal $V_{in2}$ is generated, which is greater than 3.3 V. A reference voltage of 3.3V is included in a first comparator input signal $V_{ref}$ from the voltage adjustor 1860.

Since the second comparator input signal $V_{in2}$ is greater than the first comparator input signal $V_{ref}$, the comparator 1870 outputs a voltage of 3.3 V corresponding to a power $V_{dd}$ to operate the comparator 1870. Accordingly, the switch unit 1840, that is, the first switch 1842 and the second switch 1844 of the switch unit 1840, is turned OFF.

When the switch unit 1840, that is, the first switch 1842 and the second switch 1844 of the switch unit 1840, is turned OFF, a power is not input into the rectifier 1820. Accordingly, a power accumulated in the capacitor 1825 is consumed, and the input voltage $V_{in1}$ is decreased to be less than or equal to 10 V. When the input voltage $V_{in1}$ is controlled to be less than a predetermined voltage, the rectifier 1820 and/or the like is protected. When the input voltage $V_{in1}$ becomes less than 10 V, a switch control signal of 0 V is output, and the switch unit 1840, that is, the first switch 1842 and the second switch 1844 of the switch unit 1840, is turned ON again. Accordingly, in the full charging state, operations of turning the switch unit 1840 OFF and ON is iterated as aforementioned.

Figure 21:
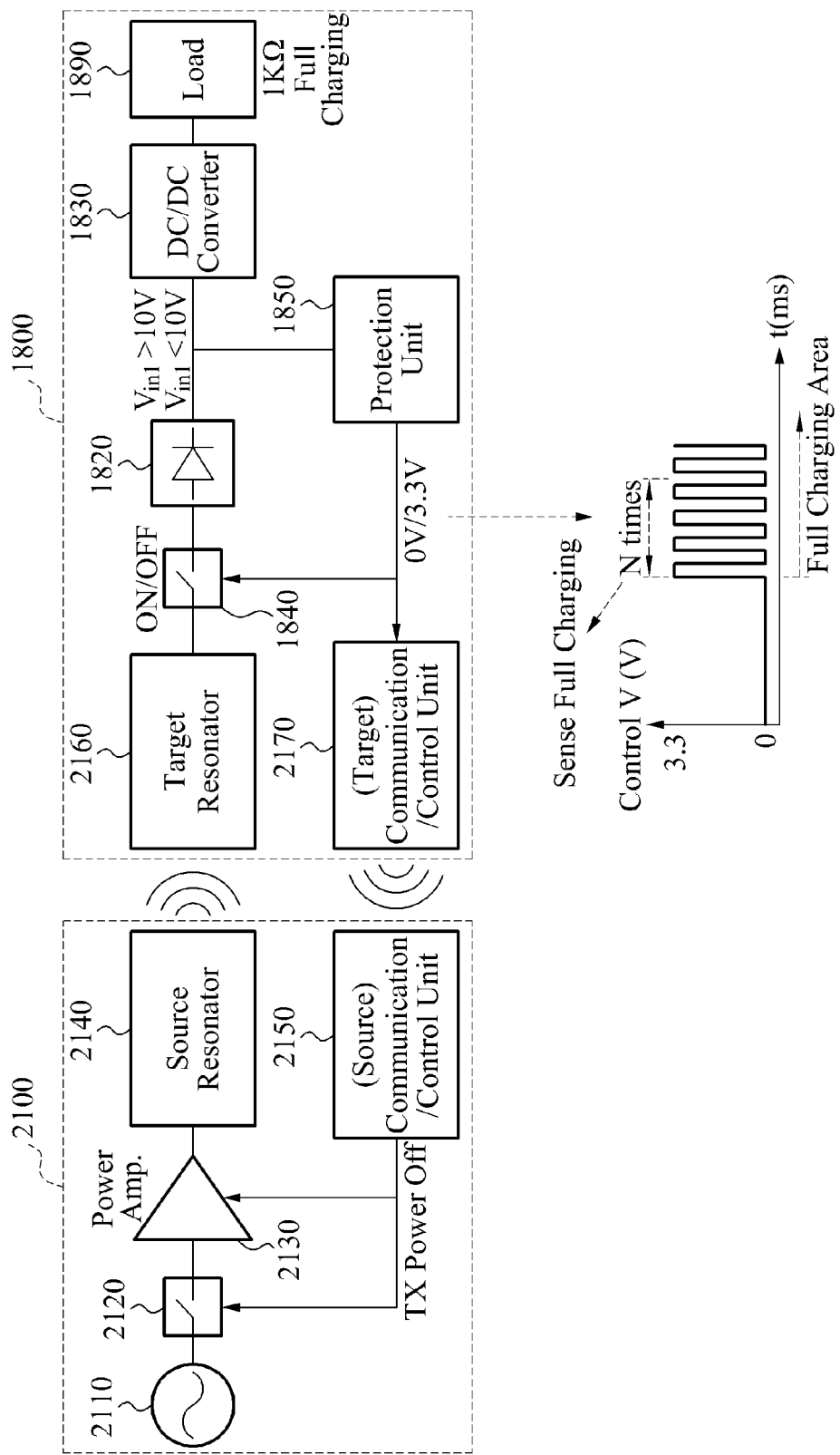
FIG. 21 is a diagram illustrating an example of operations of a wireless power transmitter and a wireless power receiver in a full charging mode.

FIG. 21 illustrates an example of operations of a wireless power transmitter 2100 and the wireless power receiver 1800 in a full charging mode. In more detail, FIG. 21 describes a method of sensing a full charging state of the load 1890, and a method of blocking a power of the wireless power transmitter 2100 through a communication between the wireless power transmitter 2100 and the wireless power receiver 1800.

The wireless power transmitter 2100 includes a signal generator 2110, a switch 2120, a power amplifier 2130, a source resonator 2140, and a communication/control unit 2150. The signal generator 2110 generates a signal for wireless power transmission.

The switch 2120 connects or disconnects the signal generator 2110 and the power amplifier 2130. The power amplifier 2130 generates an amplified signal by amplifying the signal generated by the signal generator 2110.

The source resonator 2140 transfers, through a resonance, the amplified signal to a target resonator 2160 of the wireless power receiver 1800. The communication/control unit 2150 controls the switch 2120 and the power amplifier 2130 based on a signal transmitted from a communication/control unit 2170 of the wireless power receiver 1800. The communication/control unit 2150 may include, for example, a Micro Controller Unit (MCU).

The wireless power receiver 1800 includes the target resonator 2160 and the communication/control unit 2170. The target resonator 2160 may include, for example, a matching circuit (not shown). The target resonator 2160 generates a signal by receiving the power transmitted from the wireless power transmitter 2100.

The communication/control unit 2170 receives a switch control signal from the protection unit 1850. The communication/control unit 2170 transmits, based on the received switch control signal, a power transmission suspension signal to the wireless power transmitter 2100. The power transmission suspension signal may include a signal requesting suspension of power transmission.

When the load 1890 is fully charged, and an impedance of the load 1890 is constantly maintained to be a few kΩ corresponding to a full charging impedance, an input voltage $V_{in1}$ is greater than 10 V. Accordingly, the protection unit 1850 generates a switch control signal having a high control voltage of 3.3 V, thereby turning OFF two switches (not shown) of the switch unit 1840.

When the two switches are turned OFF, a power to be supplied to the rectifier 1820 is blocked, and a power accumulated in a capacitor (not shown) is consumed, whereby the input voltage $V_{in1}$ becomes less than 10 V. Here, the capacitor may correspond to the capacitor 1825 of FIG. 18. When the input voltage $V_{in1}$ becomes less than 10 V, the protection unit 1850 generates a switch control signal having a low control voltage of 0 V, and the two switches of the switch unit 1840 are turned ON based on the switch control signal.

When the above-described process of turning the switch unit 1840 ON and OFF is iterated, an output wave pattern of the control voltage of the switch control signal, in which a low control voltage and a high control voltage are iterated, is generated in a full charging area. For example, when the control voltage of the switch control signal is changed to the low control voltage and the high control voltage, iteratively, the communication/control unit 2170 counts a number of times the control voltage of the switch control signal is changed. When the number of times the control voltage of the switch control signal is changed corresponds to N, the communication/control unit 2170 senses a full charging state of the wireless power receiver 1800, and transmits a power transmission suspension signal to the wireless power transmitter 2100. Here, N may be, for example, an integer greater than or equal to 1. The value of N may be predetermined through an experiment.

That is, the communication/control unit 2170 transmits the power transmission suspension signal when the received switch control signal is changed, N number of times, between a signal indicating that the load 1890 is being charged (e.g., a low control voltage of 0 V), and a signal indicating that the load 1890 is fully charged (e.g., a high control voltage of 3.3 V). When the wireless power transmitter 2100 suspends the power transmission, the charging process is completed.

The wireless power transmitter 2100 and the wireless power receiver 1800 may perform an in-band communication in which a power supply frequency corresponds to a communication frequency. In addition, the wireless power transmitter 2100 and the wireless power receiver 1800 may perform an out-band communication in which the power supply frequency is different from the communication frequency.

When a method in which the communication/control unit 2170 recognizes a full charging state by counting an N number of times, is used, a case in which the protection unit 1850 is operated in a transient area of the beginning of the charging process, that is, a case in which the protection unit 1850 outputs a switch control signal to turn the two switches OFF, may not be recognized as a full charging state. Also, in this method, a case in which the protection unit 1850 is temporarily operated due to a transient surge voltage and/or the like, may not be recognized as a full charging state. In both of these cases, the wireless power transmitter 2100 may constantly transmit the power.

As described above, the wireless power receiver 1800 may sense the full charging state by counting an N number of times a control voltage is changed. Thus, the wireless power receiver 1800 may distinguish between 1) conversion of the control voltage in a transient period, and 2) the control voltage due to the transient surge voltage. The wireless power receiver 1800 may not be required to use a separate current sensor, and/or the like, to sense the full charging state.

When a battery (not shown) is fully charged, a wireless charging operation may be completed by suspending the power transmission of the wireless power transmitter 2100 through communication. Accordingly, the wireless power transmitter 2100 may be protected as well. By adding the protection unit 1850 and the communication/control unit 2170 to the wireless power receiver 1800, the wireless power receiver 1800 may be applied to the battery including an existing PCM (not shown), may act as a protection circuit, and may sense a full charging state, simultaneously.

Figure 22:
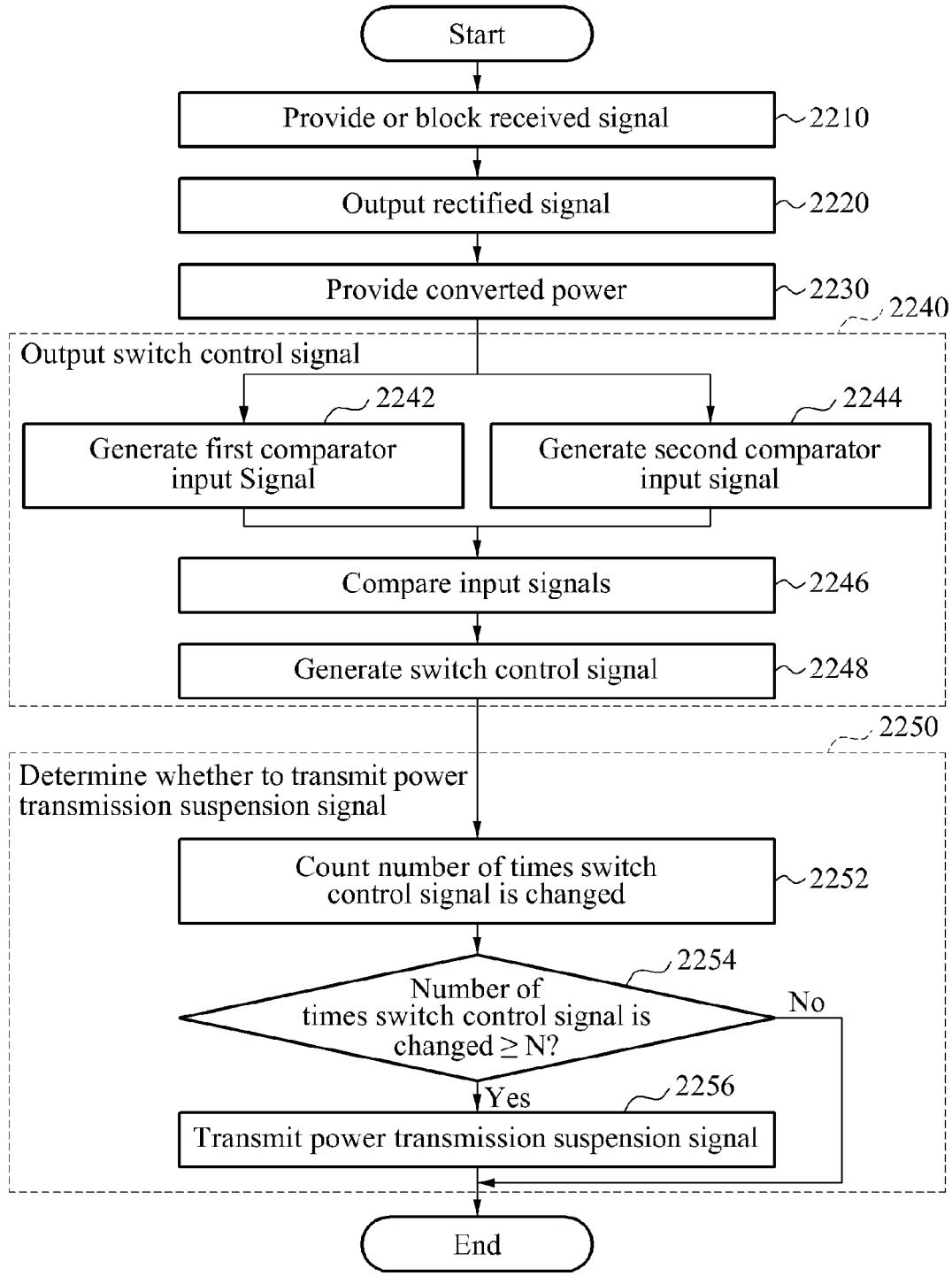
FIG. 22 is a flowchart illustrating an example of a method of receiving a wireless power.

FIG. 22 illustrates an example of a method of receiving a wireless power. The method of FIG. 22 may be performed by the wireless power receiver 1800 of FIG. 21.

At step 2210, the switch unit 1840 provides or blocks a received signal from the target resonator 2160. In more detail, the switch unit 1840 provides, to the rectifier 1820, the received signal, or blocks, from the rectifier 1820, the received signal, based on a switch control signal outputted from the protection unit 1850.

At step 2220, the rectifier 1820 outputs a rectified signal through an output end, by rectifying the received signal from the target resonator 2160. The output end of the rectifier 1820 is connected to one end of a capacitor. Another end of the capacitor is connected to ground. Here, the capacitor may correspond to the capacitor 1825 of FIG. 18.

At step 2230, the DC/DC converter 1830, which is connected to the output end of the rectifier 1820 and the load 1890, generates a converted power by converting the rectified signal, and provides the converted power to the load 1890. At step 2240, the protection unit 1850 outputs the switch control signal to close or open the switch unit 1840, based on a voltage of the converted power and a voltage of the rectified signal.

In more detail, step 2240 includes steps 2242, 2244, 2246, and 2248. At step 2242, a voltage adjustor (not shown) of the protection unit 1850 generates a first comparator input signal by adjusting a voltage of the converted power.

At step 2244, a first voltage divider (not shown) of the protection unit 1850 generates a second comparator input signal by dividing a voltage of a rectified signal. At step 2246, a comparator (not shown) of the protection unit 1850 compares the first comparator input signal and the second comparator input signal to output a comparator output signal through an output end of the comparator.

At step 2248, a second voltage divider (not shown) of the protection unit 1850 generates a switch control signal to control (e.g., close or open) the switch unit 1840, by dividing a voltage of the comparator output signal. Here, the voltage adjustor, the first voltage divider, the comparator, and the second voltage divider may correspond to the voltage adjustor 1860, the first voltage divider 1881, the comparator 1870, and the second voltage divider 1885 of FIG. 18, respectively.

At step 2250, the communication/control unit 2170 determines whether to transmit, to the wireless power transmitter 2100 of FIG. 21, a power transmission suspension signal. For example, the communication/control unit 2170 receives the switch control signal from the protection unit 1850, and transmits the power transmission suspension signal to the wireless power transmitter 2100, based on the received switch control signal.

In more detail, step 2250 includes steps 2252, 2254, and 2256. In 2252, the communication/control unit 2170 counts a number of times the switch control signal is changed between a signal indicating that the load 1890 is being charged, and a signal indicating that the load 1890 is fully charged.

At step 2254, the communication/control unit 2170 verifies whether the number of times the switch control signal is changed, is greater than or equal to an N number of times. If the number of times is greater than or equal to the N number of times, the method continues at step 2256. Otherwise, the method ends. At step 2256, the communication/control unit 2170 transmits the power transmission suspension signal to the wireless power transmitter 2100, which suspends power transmission accordingly.

The descriptions provided with reference to FIGS. 1 through 21 may be applied to the method of FIG. 22, and thus, detailed descriptions will be omitted for conciseness. The descriptions provided with reference to FIGS. 1 through 22 according to the examples may be applied to a predetermined resonance-type wireless power receiver, irrespective of a level of power. For example, the descriptions provided with reference to FIGS. 1 through 22 may be applied to an electric vehicle using a power of a high level.

Figure 23:
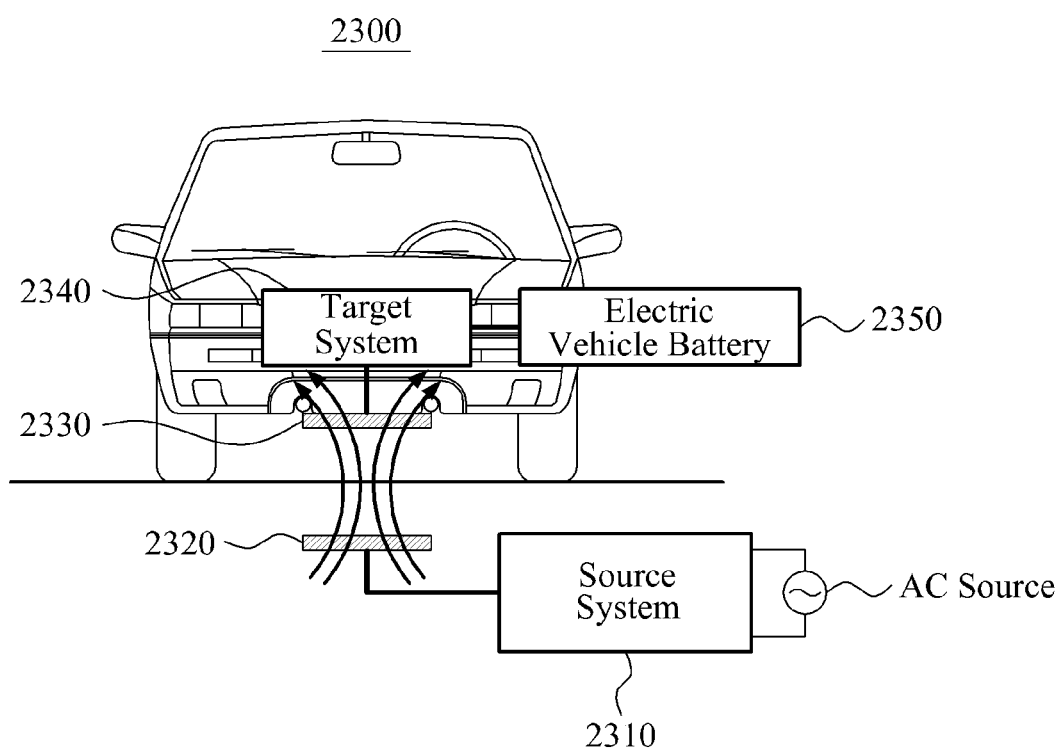
FIG. 23 is a diagram illustrating an example of an electric vehicle charging system.

FIG. 23 illustrates an example of an electric vehicle charging system.

Referring to FIG. 23, an electric vehicle charging system 2300 includes a source system 2310, a source resonator 2320, a target resonator 2330, a target system 2340, and an electric vehicle battery 2350.

The electric vehicle charging system 2300 may have a similar structure to the wireless power transmission and charging system of FIG. 1. The source system 2310 and the source resonator 2320 in the electric vehicle charging system 2300 may function as a source. Additionally, the target resonator 2330 and the target system 2340 in the electric vehicle charging system 2300 may function as a target.

The source system 2310 may include an AC/DC converter, a power detector, a power converter, a control/communication unit, similarly to the source device 110 of FIG. 1. The target system 2340 may include a rectification unit, a DC/DC converter, a switch unit, a charging unit, and a control/communication unit, similarly to the target device 120 of FIG. 1.

The electric vehicle battery 2350 may be charged by the target system 2340.

The electric vehicle charging system 2300 may use a resonant frequency in a band of a few kilohertz (KHz) to tens of MHz.

The source system 2310 may generate power, based on a type of charging vehicle, a capacity of a battery, and a charging state of a battery, and may supply the generated power to the target system 2340.

The source system 2310 may control the source resonator 2320 and the target resonator 2330 to be aligned. For example, when the source resonator 2320 and the target resonator 2330 are not aligned, the control/communication unit of the source system 2310 may transmit a message to the target system 2340, and may control alignment between the source resonator 2320 and the target resonator 2330.

For example, when the target resonator 2330 is not located in a position enabling maximum magnetic resonance, the source resonator 2320 and the target resonator 2330 may not be aligned. When a vehicle does not stop accurately, the source system 2310 may induce a position of the vehicle to be adjusted, and may control the source resonator 2320 and the target resonator 2330 to be aligned.

The source system 2310 and the target system 2340 may transmit or receive an ID of a vehicle, or may exchange various messages, through communication.

The descriptions of FIGS. 2 through 22 may be applied to the electric vehicle charging system 2300. However, the electric vehicle charging system 2300 may use a resonant frequency in a band of a few KHz to tens of MHz, and may transmit power that is equal to or higher than tens of watts to charge the electric vehicle battery 2350.

Figure 24A:
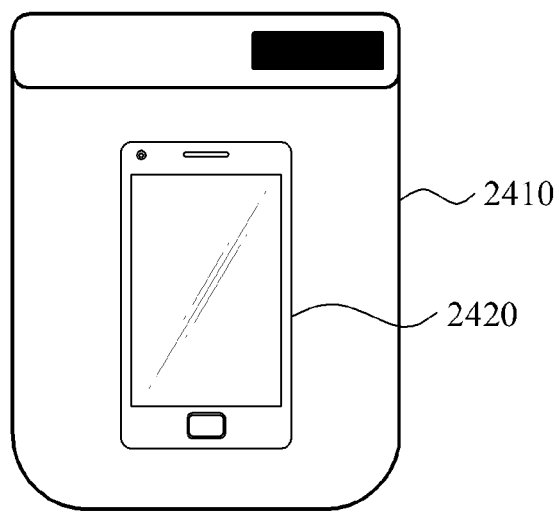
FIGS. 24a through 25b are diagrams illustrating examples of applications in which a wireless power receiver and a wireless power transmitter may be mounted.
Figure 24B:
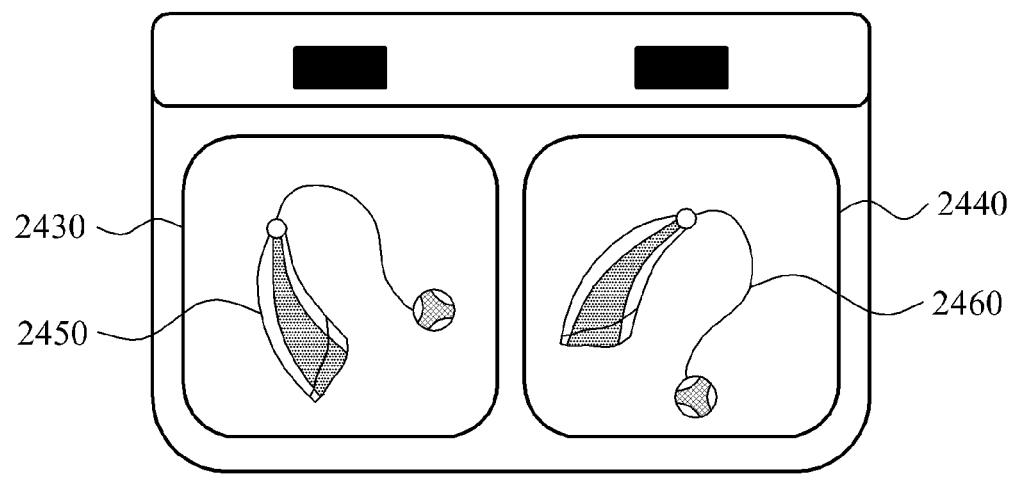

FIGS. 24A through 24B illustrate examples of applications in which a wireless power receiver and a wireless power transmitter may be mounted.

FIG. 24A illustrates an example of wireless power charging between a pad 2410 and a mobile terminal 2420, and FIG. 24B illustrates an example of wireless power charging between pads 2430 and 2440 and hearing aids 2450 and 2460.

In an example, a wireless power transmitter may be mounted in the pad 2410, and a wireless power receiver may be mounted in the mobile terminal 2420. The pad 2410 may be used to charge a single mobile terminal, namely the mobile terminal 2420.

In another example, two wireless power transmitters may be respectively mounted in the pads 2430 and 2440. The hearing aids 2450 and 2460 may be used for a left ear and a right ear, respectively. In this example, two wireless power receivers may be respectively mounted in the hearing aids 2450 and 2460.

Figure 25A:
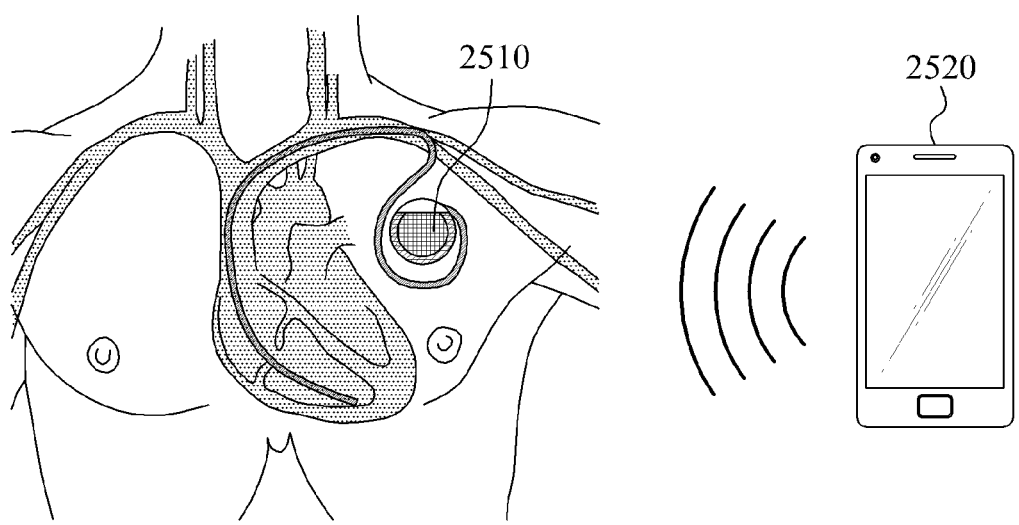
Figure 25B:
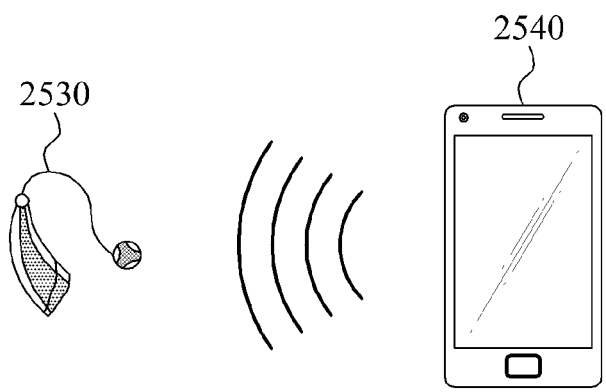

FIG. 25A illustrates an example of wireless power charging between an electronic device 2510 that is inserted into a human body, and a mobile terminal 2520. FIG. 25B illustrates an example of wireless power charging between a hearing aid 2530 and a mobile terminal 2540.

In an example, a wireless power transmitter and a wireless power receiver may be mounted in the mobile terminal 2520. In this example, another wireless power receiver may be mounted in the electronic device 2510. The electronic device 2510 may be charged by receiving power from the mobile terminal 2520.

In another example, a wireless power transmitter and a wireless power receiver may be mounted in the mobile terminal 2540. In this example, another wireless power receiver may be mounted in the hearing aid 2530. The hearing aid 2530 may be charged by receiving power from the mobile terminal 2540. Low-power electronic devices, for example Bluetooth earphones, may also be charged by receiving power from the mobile terminal 2540.

Figure 26:
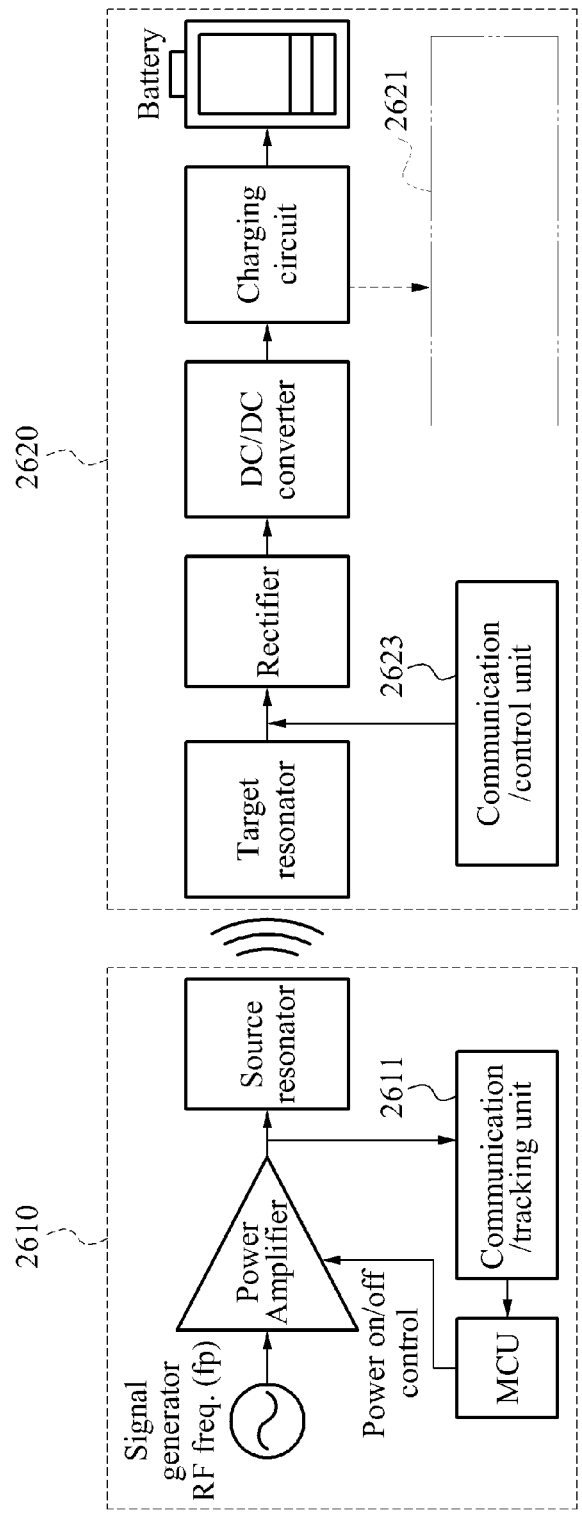
FIG. 26 is a diagram illustrating an example of a wireless power transmitter and a wireless power receiver.

FIG. 26 illustrates an example of a wireless power transmitter and a wireless power receiver.

In FIG. 26, a wireless power transmitter 2610 may be mounted in each of the pads 2430 and 2440 of FIG. 24B. Additionally, the wireless power transmitter 2610 may be mounted in the mobile terminal 2540 of FIG. 25B.

In addition, a wireless power receiver 2620 may be mounted in each of the hearing aids 2450 and 2460 of FIG. 24B.

The wireless power transmitter 2610 may have a similar configuration to the source device 110 of FIG. 1. For example, the wireless power transmitter 2610 may include a unit configured to transmit power using magnetic coupling.

As illustrated in FIG. 26, the wireless power transmitter 2610 includes a communication/tracking unit 2611. The communication/tracking unit 2611 may communicate with the wireless power receiver 2620, and may control an impedance and a resonant frequency to maintain a wireless power transmission efficiency. Additionally, the communication/tracking unit 2611 may perform similar functions to the power converter 114 and the control/communication unit 115 of FIG. 1.

The wireless power receiver 2620 may have a similar configuration to the target device 120 of FIG. 1. For example, the wireless power receiver 2620 may include a unit configured to wirelessly receive power and to charge a battery. As illustrated in FIG. 26, the wireless power receiver 2620 includes a target resonator, a rectifier, a DC/DC converter, and a charging circuit. Additionally, the wireless power receiver 2620 may include a control/communication unit 2623.

The communication/control unit 2623 may communicate with the wireless power transmitter 2610, and may perform an operation to protect overvoltage and overcurrent.

The wireless power receiver 2620 may include a hearing device circuit 2621. The hearing device circuit 2621 may be charged by the battery. The hearing device circuit 2621 may include a microphone, an analog-to-digital converter (ADC), a processor, a digital-to-analog converter (DAC), and a receiver. For example, the hearing device circuit 2621 may have the same configuration as a hearing aid.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power receiver comprising:
a rectifier comprising an input and an output, and configured to receive a power through the input, to rectify the power to produce a rectified power, and to output the rectified power through the output;
a capacitor connected to the output of the rectifier and to ground;
a direct current-to-direct current (DC/DC) converter connected to the output of the rectifier and to a load, and configured to convert the rectified power to a converted power, and to provide the converted power to the load;
a switch unit connected to the input of the rectifier;
a protection unit configured to control the switch unit to open or close based on a voltage of the rectified power;
wherein the converted power changes the load, and
wherein the protection unit is further configured to generate a switch control signal to comprise a first value when the load is being charged, and a second value when the load is fully charged; and
a communication/control unit configured to
receive, from the protection unit, the switch control signal, and
transmit, to a wireless power transmitter that transmits the power to the rectifier, a power transmission suspension signal when the switch control signal changes between the first value and the second value, an N number of times, N being an integer greater than or equal to 2.

2. The wireless power receiver of claim 1, wherein the protection unit comprises:
a voltage adjustor configured to adjust a voltage of the converted power to generate a first comparator input signal;
a first voltage divider configured to divide the voltage of the rectified power to generate a second comparator input signal;
a comparator configured to compare the first comparator input signal and the second comparator input signal, and to output a comparator output signal based on a result the comparison; and
a second voltage divider configured to divide a voltage of the comparator output signal to generate the switch control signal to control the switch unit to open or close.

3. The wireless power receiver of claim 2, wherein:
the comparator comprises
a positive input connected to the first voltage divider to receive the second comparator input signal,
a negative input connected to the voltage adjustor to receive the first comparator input signal, and
an output to output the comparator output signal;
the first voltage divider comprises
a first resistor connected to the positive input of the comparator and to the output of the rectifier, and
a second resistor connected to the positive input of the comparator and to the ground; and
the second voltage divider comprises
a third resistor connected to the switch unit and to the output of the comparator, and
a fourth resistor connected to the output of the comparator and to the ground.

4. The wireless power receiver of claim 1, wherein:
the protection unit is further configured to control the switch unit to close when the voltage of the rectified power is less than a threshold, to enable the rectifier to receive the power through the switch unit and the input; and
the protection unit is further configured to control the switch unit to open when the voltage of the rectified power is greater than the threshold, to block the rectifier from receiving the power through the switch unit and the input.

5. The wireless power receiver of claim 1, wherein the switch unit comprises a p-channel metal-oxide-semiconductor field-effect transistor (PMOSFET) switch.

6. The wireless power receiver of claim 1, wherein:
the converted power charges the load;
the protection unit is further configured to output the switch control signal to control the switch unit to close while the load is being charged; and the protection unit is further configured to output the switch control signal to control the switch unit to open when the load is fully charged.

7. A method of receiving a wireless power, comprising:

rectifying a power received from a resonator;

converting the rectified power to a converted power;

providing the converted power to a load;

providing or blocking the rectifying of the power, by a switch control signal, based on a voltage of the rectified power, wherein the converted power charges the load, and wherein the switch control signal comprises a first value when the load is being charged, and a second value when the load is fully charged; and transmitting, to a wireless power transmitter that transmits the power to the resonator, a power transmission suspension signal when the number of times the switch control signal changes is greater than or equal to N, N being an integer greater than or equal to 2.

8. The method of claim 7, wherein the providing or blocking of the rectifying of the power comprises:

adjusting a voltage of the converted power to generate a first comparator input signal;

dividing a voltage of the rectified power to generate a second comparator input signal;

comparing the first comparator input signal and the second comparator input signal to output a comparator output signal based on a result the comparison; and dividing a voltage of the comparator output signal to generate the switch control signal to provide or block the rectifying of the power.

9. A non-transitory computer-readable storage medium storing a program comprising instructions to cause a computer to perform the method of claim 7.

* * * * *